United States Patent
Stewart

(10) Patent No.: US 7,899,264 B2
(45) Date of Patent: Mar. 1, 2011

(54) METHOD OF DETERMINING A MEASURE OF EDGE STRENGTH AND FOCUS

(75) Inventor: Brian Douglas Stewart, Edinburgh (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 1608 days.

(21) Appl. No.: 11/198,650

(22) Filed: Aug. 5, 2005

(65) Prior Publication Data

US 2006/0029284 A1 Feb. 9, 2006

(30) Foreign Application Priority Data

Aug. 7, 2004 (EP) .................................... 04254772

(51) Int. Cl.
*G06K 9/40* (2006.01)
*G02B 7/04* (2006.01)
*G02B 27/40* (2006.01)
*G02B 27/64* (2006.01)
*G03B 13/00* (2006.01)
*G03B 27/52* (2006.01)
*G03B 13/32* (2006.01)
*H04N 5/232* (2006.01)

(52) U.S. Cl. ................ 382/255; 250/201.2; 348/345; 355/55; 396/89

(58) Field of Classification Search .............. 382/255; 250/201.2–201.8; 348/345–357; 355/55–63; 396/89

See application file for complete search history.

(56) References Cited

U.S. PATENT DOCUMENTS

| | | | | |
|---|---|---|---|---|
| 5,396,336 A | * | 3/1995 | Yoshii et al. | 348/345 |
| 6,067,115 A | * | 5/2000 | Suda | 348/350 |
| 2001/0010579 A1 | * | 8/2001 | Nishi | 355/67 |
| 2002/0114531 A1 | * | 8/2002 | Torunoglu | 382/255 |
| 2004/0223662 A1 | * | 11/2004 | Urano et al. | 382/299 |
| 2007/0122025 A1 | * | 5/2007 | Christian et al. | 382/141 |

OTHER PUBLICATIONS

Katajamak et al.; "Objective Quality Potential Measures of Natural Color Images", The Society for Imaging Science and Technology, Springfield, VA, US, vol. 42, No. 3, May 1998, pp. 250-263, XP000979385.

Nayar et al., "Shape from Focus: An Effective Approach for Rough Surfaces", Proceedings of the International Conference on Robotics and Automation, Cincinnati, USA, May 13-18, 1990, vol. 1, pp. 218-225, XP000139932.

* cited by examiner

Primary Examiner — Anand Bhatnagar
Assistant Examiner — Randolph Chu
(74) Attorney, Agent, or Firm — Lisa K. Jorgenson; Allen, Dyer, Doppelt, Milbrath & Gilchrist, P.A.

(57) ABSTRACT

The method of determining a focus measure from an image includes detecting one or more edges in the image by processing the image with one or more first order edge detection kernels adapted to reject edge phasing effects. A first measure of the strength of each of the edges, and the contrast of each of the edges may be determined. The method may include normalizing the first measure of the strength of each of the edges by the contrast of each of the edges to obtain a second measure of the strength of each of the edges, and rescaling the second measure of the strength of each of the edges. The method may also include selecting one or more of the edges from the image in accordance with the second measure of their strengths, and calculating the focus measure from the second measure of the strengths of the selected edges.

30 Claims, 15 Drawing Sheets

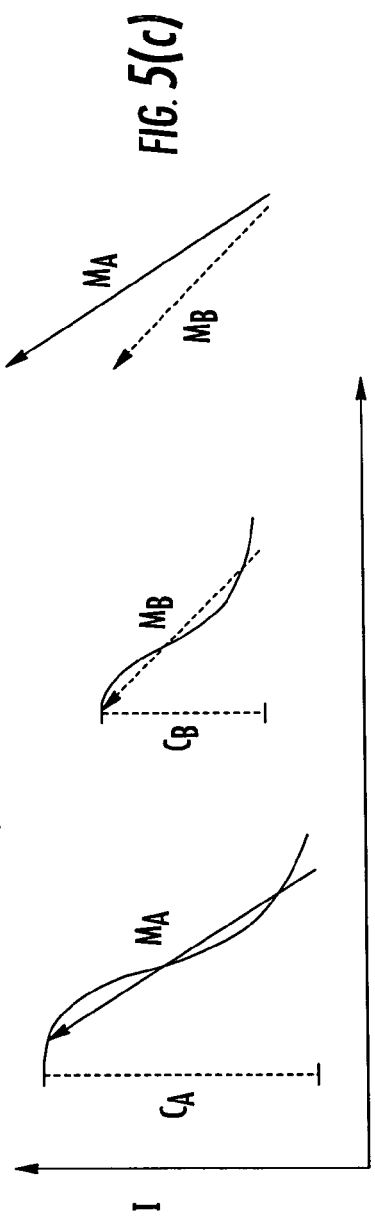
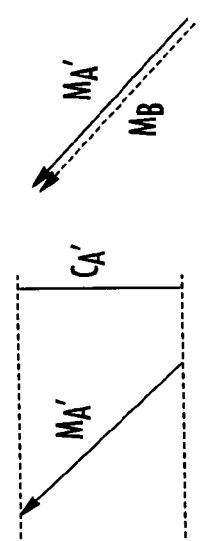
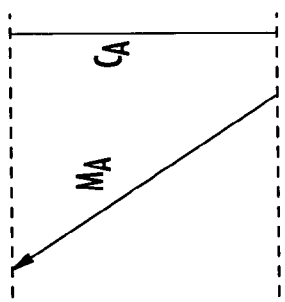
FIG. 5(a)
FIG. 5(b)
FIG. 5(c)
FIG. 5(d)
FIG. 5(e)
FIG. 5(f)

METHOD OF DETERMINING A MEASURE OF EDGE STRENGTH AND FOCUS

FIELD OF THE INVENTION

The present invention relates to image processing, and more particularly, to determining local contrast normalized edge strengths from an imaged scene and using the local contrast normalized edge strengths to determine a focus measure for the scene.

BACKGROUND OF THE INVENTION

The aim of auto-focusing is to position a camera lens so that a scene of interest is properly focused. Consequently, auto-focusing can be represented as an optimization problem including determining a focus measurement at a given lens position and moving the camera or the camera lens to improve the focus measurement. These two steps are typically integrated into a hill-climbing process and repeated until the focus measurement has been maximized.

The present invention is concerned with the first of the above steps, namely obtaining a focus measurement for a given lens position relative to a scene of interest. Accordingly, it is useful at this point to briefly review existing methods of focus measurement and the problems associated therewith, by referring to the accompanying Figures in which: FIG. 1 is a graph of the pixel intensity response profile of a pixel array to an edge between a bright region and a dark region in a scene, wherein the graph also shows the edge strength and contrast parameters of the imaged scene; FIG. 2(a) is a graph of the intensity (I) measured from two pixels ($P_1$ and $P_2$) as a function of exposure time (T); FIG. 2(b) is a graph of the intensity (I) measured from two pixels ($P_1$ and $P_2$) as a function of gain (G); FIG. 3(a) is diagram of an edge between two regions $R_1$, $R_2$ in an image obtained under bright and dark lighting conditions; FIG. 3(b) are graphs of the intensity profile of a pixel array to regions $R_1$ and $R_2$ in the images shown in FIG. 3(a); and FIG. 4 is an image of a cylindrical object against a background and sections taken thereof.

Review of Existing Methods of Focus Measurement

The process of focus measurement attempts to determine the degree of camera focus from an analysis of image data. A well-focused image is one in which edges are sharp (i.e. not diffuse) and the overall contrast in the image is maximized. These two observations lead to two methods of determining whether an image is in focus, namely edge-based methods and contrast-based methods.

Referring to FIG. 1, the pixel intensity I profile derived from the response of a pixel array to an edge between a dark region and a bright region is typically sigmoidal in shape. In particular, the pixel intensity I is greatest when imaging a bright region and smallest when imaging a dark region. The strength of the edge E between a bright and dark region can be described by the slope of the rising portion of the sigmoidal pixel intensity profile. Accordingly, when an edge in an image is very sharply defined, the rising portion of the pixel intensity profile is very steep, whereas if the edge is diffuse or less sharply defined, the rising portion of the pixel intensity profile is correspondingly shallow. The contrast C in the imaged scene can be described as the difference between the maximum and minimum intensity signals from the pixel array.

Since the measurement of edge strength is restricted to the rising portion of the pixel intensity profile, whereas contrast covers the entire pixel intensity profile, the number of pixels used for calculating edge strength $P_E$ is typically less than the number of pixels used for calculating contrast $P_C$.

Edge-based methods of focus measurement are based on the premise that an edge detector is more likely to detect the edges in a properly focused image than in an unfocused image. Or in other words, the output of an edge detector when applied to an image should be greater when the image is properly focused than when poorly focused. Contrast-based methods of focus measurement are based on the premise that the overall contrast in an image is maximized when the image is properly focused.

Limitations of Existing Methods of Focus Measurement and Practical Effects Thereof Ideally, a focus measurement should be independent of the illumination or content of a scene. However, both edge-based and contrast-based methods of focus measurement provide relative focus measurements obtained from comparisons between frames. Accordingly, the value of the focus measurements produced by the edge-based and contrast-based methods vary if the exposure time of the camera or the scene illumination or content is altered. Consequently, the above-mentioned auto-focusing optimization procedure must be halted or re-initiated if the content or illumination of a scene changes.

Furthermore, since relative focus measures vary in accordance with the content of a scene, separate regions of a scene cannot be directly compared. This may be particularly problematic if a scene contains several objects positioned at different distances relative to the camera. In addition, since edge-based and contrast-based methods of focus measurement provide inherently relative measures of focus, they generally do not provide information regarding the absolute focus quality of a given image, but instead provide information indicating whether focus has improved or deteriorated between frames.

The above-mentioned limitations of conventional edge-based and contrast-based methods of focus measurement will be discussed in more detail below.

Edge-Based Methods of Focus Measurement

In its simplest implementation, edge-strength can be determined by measuring differences in intensity between adjacent pixels. However, this measurement is affected by exposure time and gain changes in a light sensor as will be discussed below.

Effects of Exposure Time: Referring to FIG. 2(a) while the intensity I measured from pixels $P_1$ and $P_2$ increases linearly with the exposure time T of the corresponding light sensors, the nature of the linear relationship is not the same for each pixel. In particular, the slope of the intensity-exposure time graph for pixel $P_2$ is much larger than for pixel $P_1$. Consequently, while a given increase $\Delta T$ in exposure time increases the intensity of pixel $P_1$ by a delta of $\Delta P_1$, it increases the intensity of pixel $P_2$ by a delta of $\Delta P_2$ wherein $\Delta P_2 > \Delta P_1$.

Effects of Gain: Referring to FIG. 2(b) at gain $G_1$ the intensity measured from pixel $P_2$ is larger than that measured from pixel $P_1$. Similarly, on increasing the gain to $G_2$, the intensity measured from pixel $P_2$ increases by a greater amount than that of pixel $P_1$ (i.e. the intensity of $P_2$ increases by a delta of $\Delta P_2$ whereas the intensity of $P_1$ increases by a delta of $\Delta P_1$, where $\Delta P_1 < \Delta P_2$). In other words, the variation of pixel intensity with gain differs according to the absolute value of the intensity of a given pixel. Consequently, the application of a gain to a number of pixels increases the intensity difference between the pixels by that gain factor.

With no guarantee that similar gains will be applied from one test to the next, different intensity measurements (and thus focus measures) can be obtained for the same scene.

Contrast-Based Methods of Focus Measurement

FIG. 3(a) shows an idealized image obtained by a properly focused camera from a scene under bright and dark lighting conditions. When the scene is brightly lit (case A), there is a clear and definite contrast between regions $R_1$ and $R_2$ in the acquired image. However, when the scene is less brightly lit (case B) the contrast between regions $R_1$ and $R_2$ in the acquired image is not as clearly defined.

Referring to FIG. 3(b) the intensity of the pixels that acquired the image in regions $R_1$ and $R_2$ (in FIG. 3(a)) possesses a sigmoidal profile. However, the sigmoidal pixel intensity profile in case A is much steeper than in case B. In other words, the slope $m_A$ of the rising portion of the pixel intensity profile in case A is considerably larger than in case B (i.e. $m_A > m_B$). Accordingly, since contrast-based methods of focus measurement directly relate focus measurements to contrast, the focus measurement obtained in the case A is larger than that obtained in case B despite the fact that both cases are equally well focused.

Practical Effects of Limitations of Existing Methods of Focus Measurement

The above-described limitations of edge-based and contrast-based methods of focus measurement are not merely theoretical abstractions. These limitations have practical effects on the focus measurements acquired from scenes as will be described below.

Effects of Shape of Imaged Object on Edge Based Methods of Focus Measurement

In a scene comprised of multiple objects disposed at the same distance from a camera, each edge of each object should possess the same objective focus measurement. However, in practice the shape characteristics or reflectance of an imaged object can affect the edge-strength (and thus focus measurement) detected therefrom.

Referring to FIG. 4, an image is acquired of a cylindrical object 10 against a background 11. For the purpose of the present example, it will be assumed that the object 10 is equally focused over its entire area. A first section 12 of the image depicts the interface between the object 10 and the background 11. A second section 14 of the image depicts a portion of the curved surface of the cylindrical object 10. Since the first section 12 possesses elements of the object 10 and the background 11, it typically has a larger edge strength value than the second section 14, because the second section 14 does not contain enough differential and contextual information to enable a strong edge to be detected.

As previously discussed, edge-based methods of focus measurement obtain a focus measurement by consideration of average edge values in a scene. However, as shown above, an image can possess widely varying edge values depending on the shape of the imaged object. Accordingly, the average edge-value obtained from a single image may contain contributions from the multiple edge values in the image. Consequently, the average edge-value obtained by the edge-based method of focus measurement blurs and loses the information from the multiple edge value measurements in an imaged scene.

Effect of Multiple Objects Positioned at Different Distances From a Camera

Where a region-of interest (or a whole scene) contains objects at different distances from a camera, the focus of each of these objects should be different. However, the average focusing effect of conventional edge-based and contrast-based focus measurement techniques generates an intermediate focus measurement that is likely to be incorrect for any and/or all of the objects in the scene.

SUMMARY OF THE INVENTION

According to a first aspect of the invention there is provided a method of determining a first measure of a strength of an edge in an image wherein the method comprises processing the image with one or more first order edge detection kernels adapted to reject edge phasing effects.

The edge may possess an orientation and the method further comprises the step of providing an estimate of the orientation of the edge. Preferably, a central element of each of the first order edge detection kernels is substantially equal to zero. Desirably, the first order edge detection kernels are adapted to respond to substantially horizontally, vertically or diagonally oriented edges.

According to a second aspect of the invention there is provided a method of determining a second measure of a strength of an edge in an image wherein the method comprises: determining a first measure of the strength of the edge by processing the image with one or more first order edge detection kernels adapted to reject edge phasing effects; determining the contrast of the edge; and normalizing the first measure of the strength of the edge by its contrast.

The edge may possess an orientation and the contrast of the edge is determined in the direction perpendicular to the orientation of the edge. Preferably, the normalization comprises dividing the first measure of the strength ($S_i$) of the edge by its contrast ($C_i$) according to $$\hat{S}_i = \frac{S_i}{C_i}.$$

According to a third aspect of the invention there is provided a method of determining a focus measure from a single frame of an image wherein the method comprises: detecting one or more edges in the image by processing the image with one or more first order edge detection kernels adapted to reject edge phasing effects; determining a first measure of the strength of each of the edges; determining the contrast of each of the edges; normalizing the first measure of the strength of each of the edges by the contrast of each of the edges to obtain a second measure of the strength of each of the edges; rescaling the second measure of the strength of each of the edges; selecting one or more of the edges from the image in accordance with the second measure of their strengths; and calculating the focus measure from the second measure of the strengths of the selected edges.

The normalization may comprise dividing the first measure of the strength ($S_i$) of each edge by its contrast ($C_i$) according to $$\hat{S}_i = \frac{S_i}{C_i}.$$

Preferably, edges are selected if the rescaled second measure of their edge strength exceeds a pre-defined percentage of the maximum rescaled second measure of edge strength determined from the entire image. Preferably, edges are selected if their contrast exceeds the minimum contrast determined from the entire image. Desirably, edges are selected using a histogram of the rescaled second measures of the edge strengths. Desirably, edges are selected if the rescaled second measure of their edge strength occurs with a frequency that exceeds a pre-defined percentage of the most frequently occurring second measure of edge strength in the image. Desirably, the focus measurement is calculated as the center of mass of the rescaled second measures of the strengths of the selected edges.

According to a fourth aspect of the invention there is provided a method of determining a focus measure from a single frame of an image wherein the method comprises: selecting at least two regions from the image; detecting one or more edges in each of the regions by processing each region with one or more first order edge detection kernels adapted to reject edge phasing effects; determining a first measure of the strength of each of the edges detected in each region; determining the contrast of each of the edges detected in each region; normalizing the first measure of the strength of each of the edges detected in each region by the contrast of each of the edges to obtain a second measure of the strength of each of the edges; resealing the second measure of the strength of each of the edges; selecting one or more of the edges from each region in accordance with the second measure of their strengths; calculating the focus measure for each region from the second measure of the strengths of the selected edges; and averaging the focus measures from each region.

The normalization may comprise dividing the first measure of the strength ($S_i$) of each edge by its contrast ($C_i$) according to $$\hat{S}_i = \frac{S_i}{C_i}.$$

According to a fifth aspect of the invention there is provided a method of autofocusing a lens of a camera wherein the method comprises determining a focus measure from an imaged scene, which in turn comprises: detecting one or more edges in the image by processing the image with one or more first order edge detection kernels adapted to reject edge phasing effects; determining a first measure of the strength of each of the edges; determining the contrast of each of the edges; normalizing the first measure of the strength of each of the edges in each region by the contrast of each of the edges in each region to obtain a second measure of the strength of each of the edges; rescaling the second measure of the strength of each of the edges; selecting one or more of the edges from the image in accordance with the second measure of their strengths; and calculating the focus measure from the second measure of the strengths of the selected edges. The method including: employing the focus measure in an objective function of an optimization process; altering the setting of the camera lens under the direction of the optimization process; and repeating steps until an optimal focus measure is obtained.

According to a sixth aspect of the invention there is provided a method of determining the distance between a second object and a camera with a fixed lens setting wherein the method comprises: determining a plurality of focus measures from a plurality of images of a first object positioned at a plurality of predefined distances from the camera using the method of the third or fourth aspect; developing a calibration model based on the determined focus measures and the predefined distances between the camera and the first object; determining the focus measure from an image of the second object using the method of the third or fourth aspect; and using the calibration model to calculate the distance between the camera and the second object from the determined focus measure.

According to a seventh aspect of the invention there is provided a circuit comprising a data input device or means, a data output device or means and a data processor or processing means wherein the data processing means implements a method of determining a first measure of a strength ($S_i$) of an edge from image data received from the data input means, wherein the data processing means: processes the image data with one or more first order edge detection kernels adapted to reject edge phasing effects; and transmits the resulting first measure of edge strength to the data output means.

According to an eighth aspect of the invention there is provided a circuit comprising a data input device or means, a data output device or means and a data processor or processing means wherein the data processing means implements a method of determining a second measure of a strength ($S_i$) of an edge from image data received from the data input means, wherein the data processing means: determines a first measure of the strength ($S_i$) of the edge by processing the image data with one or more first order edge detection kernels adapted to reject edge phasing effects; determines the contrast ($C_i$) of the edge; normalizes the first measure of the strength ($S_i$) of the edge by its contrast ($C_i$); and transmits the resulting second measure of the strength of the edge to the data output means.

According to a ninth aspect of the invention there is provided a circuit comprising a data input device or means, a data output device or means and a data processor or processing means wherein the data processing means implements a method of determining a focus measure from a single frame of image data received from the data input means, wherein the data processing means: detects one or more edges in the image data by processing the image data with one or more first order edge detection kernels adapted to reject edge phasing effects; determines a first measure of the strength ($S_i$) of each of the edges; determines the contrast ($C_i$) of each of the edges; normalizes the first measure of the strength ($S_i$) of each of the edges by the contrast ($C_i$) of each of the edges to obtain a second measure of the strength ($\hat{S}_i$) of each of the edges; rescales the second measure of the strength of each of the edges ($\hat{S}_i$); selects one or more of the edges from the image in accordance with the second measure of their strengths ($\hat{S}_i$); calculates the focus measure from the second measure of the strengths ($\hat{S}_i$) of the selected edges; and transmits the focus measure to the data output means.

According to a tenth aspect of the invention there is provided a circuit comprising a data input device or means, a data output device or means and a data processor or processing means wherein the data processing means implements a method of determining a focus measure from a single frame of image data received from the data input means, wherein the data processing means: selects at least two regions from the image data; detects one or more edges in each of the regions by processing each region with one or more first order edge detection kernels adapted to reject edge phasing effects; determines a first measure of the strength ($S_i$) of each of the edges detected in each region; determines the contrast ($C_i$) of each of the edges detected in each region; normalizes the first measure of the strength ($S_i$) of each of the edges detected in each region by the contrast ($C_i$) of each of the edges to obtain a second measure of the strength ($\hat{S}_i$) of each of the edges; rescales the second measure of the strength of each of the edges ($\hat{S}_i$); selects one or more of the edges from each region in accordance with the second measure of their strengths ($\hat{S}_i$); calculates the focus measure for each region from the second measure of the strengths ($\hat{S}_i$) of the selected edges; averages the focus measures from each region; and transmits the focus measure to the data output means.

According an eleventh aspect of the invention there is provided a circuit comprising a data input device or means, a data output device or means and a first and second data processor or processing means wherein the first data processing means implements a method of autofocusing a lens of a camera from image data received from the data input means and determines a focus measure from the image data, by: detecting one or more edges in the image data by processing the image data with one or more first order edge detection kernels adapted to reject edge phasing effects; determining a first measure of the strength ($S_i$) of each of the edges; determining the contrast $C_i$ of each of the edges; normalizing the first measure of the strength ($S_i$) of each of the edges in each region by the contrast ($C_i$) of each of the edges in each region to obtain a second measure of the strength ($\hat{S}_i$) of each of the edges; rescaling the second measure of the strength of each of the edges ($\hat{S}_i$); selecting one or more of the edges from the image in accordance with the second measure of their strengths ($\hat{S}_i$); and calculating the focus measure from the second measure of the strengths ($\hat{S}_i$) of the selected edges. The first data processing means transmits the focus measure to the data output means. The data output means transmits the focus measure to the second data processing means which employs the focus measure in an objective function of an optimization process; wherein the optimization process is used to direct alterations to the setting of the camera lens; and wherein the circuit repeats the above operations until an optimal focus measure is obtained.

According to a twelfth aspect of the invention there is provided a circuit comprising a data input device or means, a data output device or means and a data processor or processing means wherein the data processing means implements a method of determining the distance between a second object and a camera with a fixed lens setting wherein the data processing means: determines a plurality of focus measures from a plurality of images of a first object positioned at a plurality of predefined distances from the camera using the method provided by the third or the fourth aspect of the invention; develops a calibration model based on the determined focus measures and the predefined distances between the camera and the first object; determines the focus measure from an image of the second object using the method provided by the third or the fourth aspect of the invention; and uses the calibration model to calculate the distance between the camera and the second object from the determined focus measure.

According to a thirteenth aspect of the invention there is provided a circuit as provided by any of the seventh to twelfth aspects of the invention wherein the circuit is an integrated circuit.

According to a fourteenth aspect of the invention there is provided an electronic device comprising a circuit as provided by any of the seventh to the thirteenth aspects of the invention, a camera and at least one lens.

According to a fifteenth aspect of the invention there is provided a distance detector comprising a camera with a fixed lens setting in communication with a reporting means and a data processing means which in turn comprises a data storage means capable of storing the parameters of a calibration model. The camera determines the focus measure from an image of an object using the method provided by the third or fourth aspects of the invention and transmits the focus measure to the data processing means. The data processing means retrieves the parameters of the calibration model from the data processing means and employs the calibration model to determine the distance between the camera and the object using the method provided by the sixth aspect of the invention. The data processing means transmits the distance measurement to the reporting means which reports the distance measurement to a user.

According to a sixteenth aspect of the invention there is provided a digital video camera comprising an adjustable lens, an adjusting means and a circuit as provided by the eleventh aspect of the invention.

According to a seventeenth aspect of the invention there is provided a digital still camera comprising an adjustable lens, an adjusting means and a circuit as provided by the eleventh aspect of the invention.

According to a eighteenth aspect of the invention there is provided a mobile telephone comprising a digital still camera as provided by the seventeenth aspect of the invention or a digital video camera as provided by the sixteenth aspect of the invention and a data communication means.

According to a nineteenth aspect of the invention there is provided a web camera comprising a digital video camera as provided by the sixteenth aspect of the invention connectable to a data transmitting means.

According to a twentieth aspect of the invention there is provided a security camera comprising a digital video camera as provided by the sixteenth aspect of the invention connectable to a data recording means.

According to a twenty-first aspect of the invention there is provided at least one digital ocular device comprising an adjustable lens, an adjusting means and a circuit as provided by the eleventh aspect of the invention.

According to a twenty-second aspect of the invention there is provided an endoscope camera comprising an adjustable lens, an adjusting means and a circuit as provided by the eleventh aspect of the invention.

An absolute measurement of focus provides a metric for judging on an absolute basis whether an image is properly or improperly focused. This contrasts with conventional relative measurements of focus that only provide information regarding changes in focus (i.e. whether the focus has improved or degraded with changes in camera/lens position).

An absolute measurement of focus is also independent of scene content. Consequently, a camera may be moved without affecting the focus measurement and thus the afore-mentioned auto-focusing optimization procedure need not be halted or re-initiated if the camera moves. Similarly, the absolute measurement of focus is independent of the illumination of the scene or the exposure time of the camera. Consequently, exposure control can be performed in parallel with auto-focusing, without affecting the absolute focus measurement.

Finally, since the absolute measurement of focus is independent of the scene content, it is possible to obtain and directly compare focus measurements from different regions of a scene or from one scene to the next or between multiple cameras.

BRIEF DESCRIPTION OF THE DRAWINGS

FIG. 2(*b*) is a graph of the intensity (I) measured from two pixels ($P_1$ and $P_2$) as a function of gain (G);

FIG. 5(a) is a diagram of an edge between two regions in an image as shown in FIG. 3(a);

FIG. 5(b) is a graph of the intensity profile of a pixel array to the images shown in FIG. 5(a);

FIG. 5(c) is a diagram of the vectors representing the rising portions of the pixel intensity profiles shown in FIG. 5(b);

FIG. 5(d) is a diagram of the slope of the rising portion of the pixel intensity profile and contrast obtained from the pixel intensity profile in case A as seen in FIG. 5(b);

FIG. 5(e) is a diagram of the slope of the rising portion of the pixel intensity profile and contrast obtained from the pixel intensity profile obtained in case A and rescaled by the method of determining a measure of edge strength in accordance with the first and second aspects of the invention;

FIG. 5(f) is a diagram of the vector representing the slope of the rising portion of the rescaled pixel intensity profile obtained in case A overlaid with the vector representing the rising portion of the pixel intensity profile obtained in case B;

DETAILED DESCRIPTION OF THE PREFERRED EMBODIMENTS

For the sake of brevity, the method of obtaining a focus measurement from an imaged scene in accordance with the present invention will be referred to throughout the following description as the local contrast normalization (LCN) process. The following discussion will provide a broad overview of the LCN process and will then discuss the individual elements of the invention in more detail. The description will finish with a discussion of the many applications of the LCN process.

General Overview of the LCN Process

Both conventional edge-based and contrast-based methods of focus measurement are fundamentally flawed because they attempt to solely equate focus with either edge strength or contrast. However, neither of these parameters is solely sufficient to adequately define a focus measurement. The LCN process overcomes this problem by introducing a new variable, namely a local contrast variable. The LCN process combines the local contrast variable with the edge-strengths detected in a scene to produce normalized edge strength measurements. The local contrast normalized edge strength measurements are used in turn to calculate an absolute focus measure for the imaged scene.

Bearing in mind the previous discussions of the practical effects of the limitations of conventional edge-based and contrast-based methods of determining focus, the local contrast variable is designed to compensate for differences in illumination or lens response across an image. The local contrast variable is also designed to compensate for variation in contrast levels across the scene while thereby minimizing the effects of shadowing. Furthermore, the local contrast variable provides for a degree of tolerance to lighting-flicker induced effects.

Figure 1:
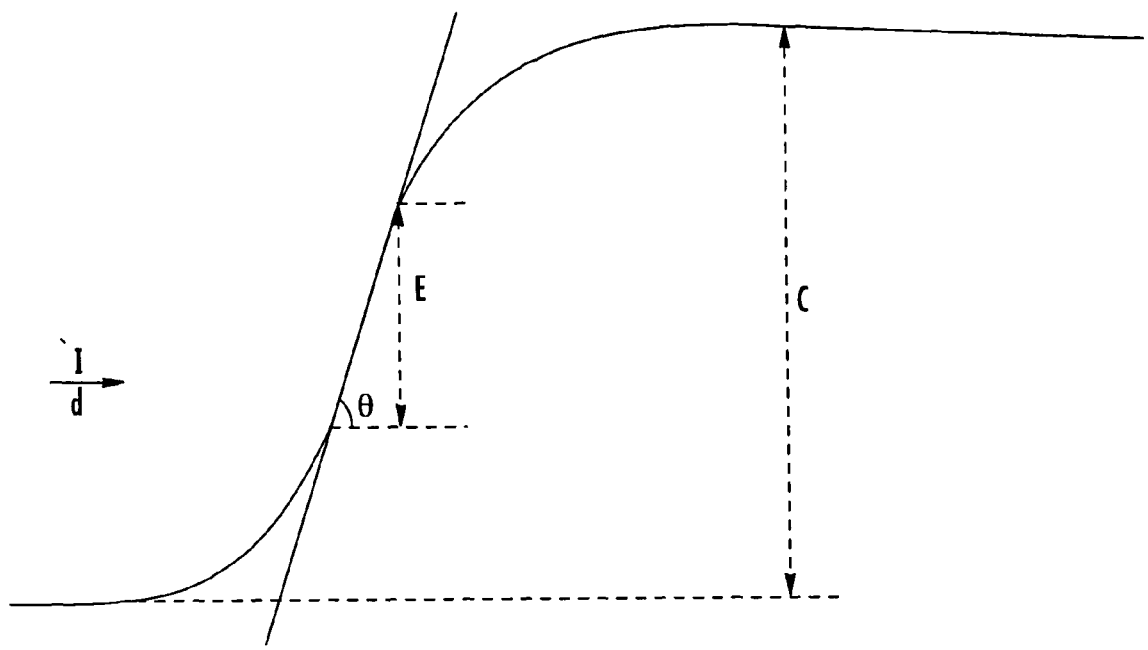
FIG. 1 is a graph illustrating the pixel intensity response profile of a pixel array to an edge between a bright region and a dark region in a scene, wherein the graph also shows the edge strength and contrast parameters of the imaged scene.
Figure 2A:
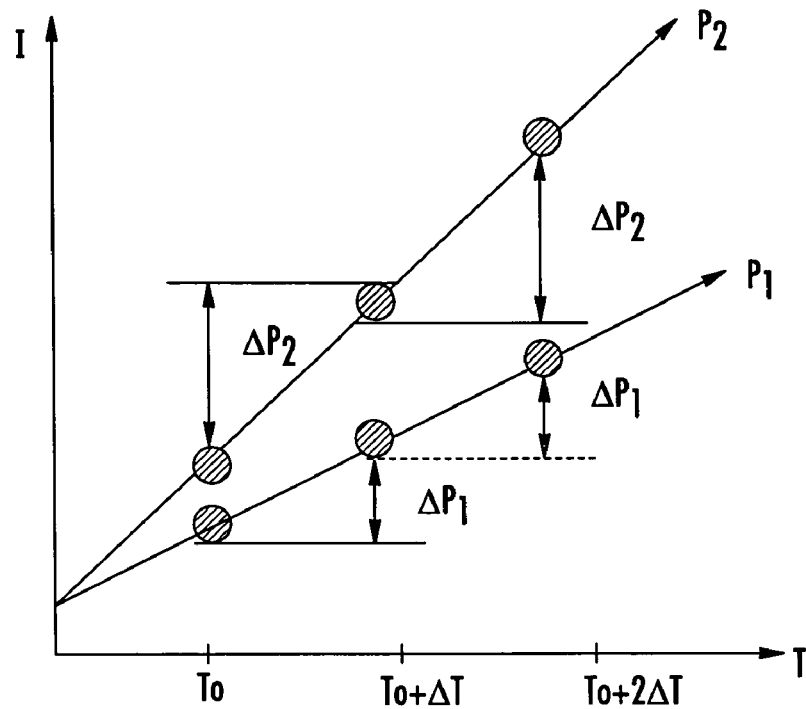
FIG. 2(*a*) is a graph of the intensity (I) measured from two pixels ($P_1$ and $P_2$) as a function of exposure time (T)
Figure 2B:
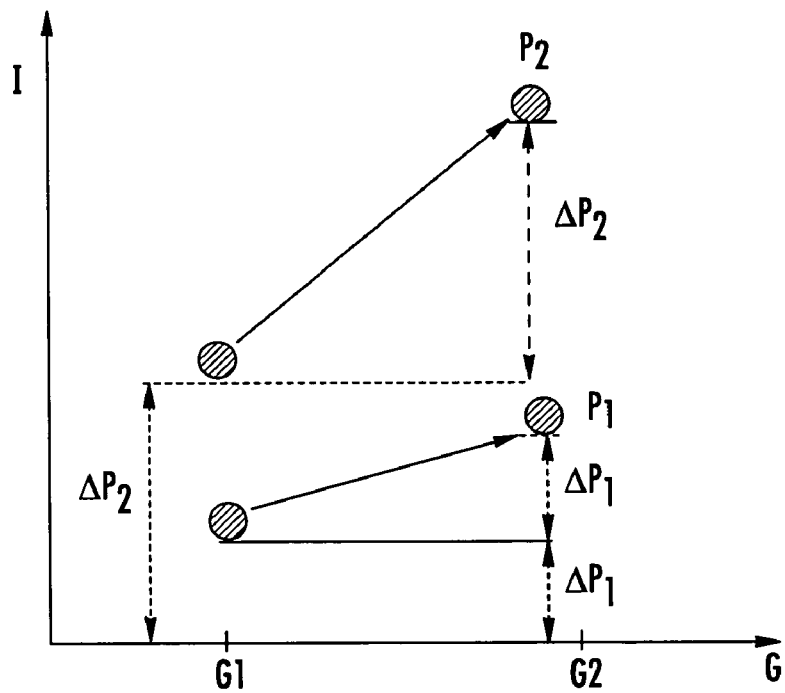
Figure 3A:
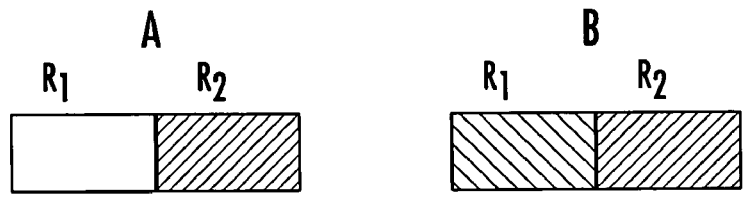
FIG. 3(a) is diagram of an edge between two regions $R_1$, $R_2$ in an image obtained under bright and dark lighting conditions.
Figure 3B:
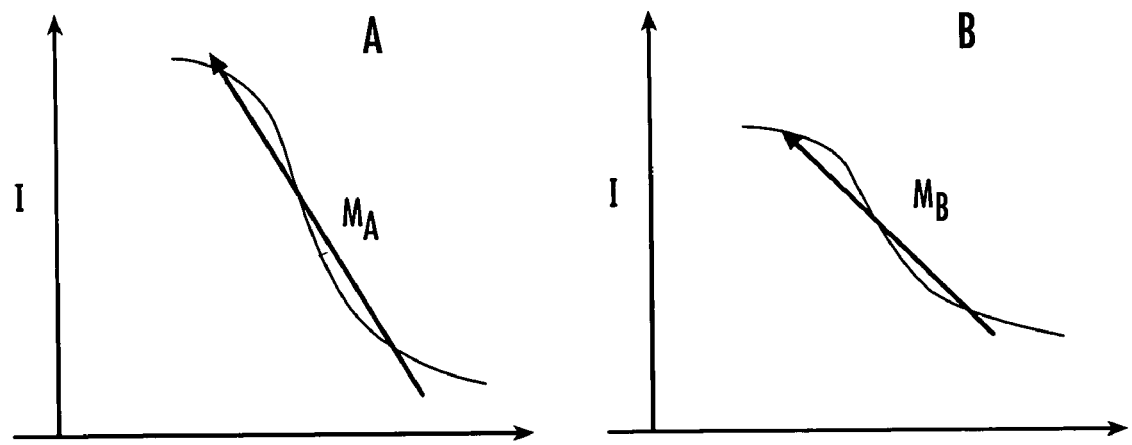
FIG. 3(b) are graphs of the intensity profile of a pixel array to regions $R_1$ and $R_2$ in the images shown in FIG. 3(a)

FIG. 5(a) shows the same idealized image obtained by a properly focused camera as shown in FIG. 3(a). As will be recalled, case A relates to an image obtained under bright lighting conditions and case B relates to the image obtained under dark lighting conditions. FIG. 5(b) shows the sigmoidal pixel intensity profile obtained in case A and case B.

It will be noted that the contrast obtained in case A (i.e. $C_A$) is considerably larger than that obtained in case B ($C_B$). It will also be noted that the slope of the rising portion of the pixel intensity profile in case A (i.e. $m_A$) is considerably larger than in case B (i.e. $m_B$), or in other words $m_A > m_B$. Furthermore, referring to FIG. 5(c) it can be seen that the vector corresponding to the rising portion of the pixel intensity profile in case A is rotated relative to the vector corresponding to the rising portion of the pixel intensity profile in case B.

Referring to FIGS. 5(d) and 5(e), in effect, the LCN process scales the edge-strengths in an image with the contrast of the edges, so that the re-scaled slope of the pixel intensity profile in case A (i.e. $m_{A'}$) is the same as the slope of the pixel intensity profile in case B (i.e. $m_{A'} = m_B$) Furthermore, referring to FIG. 5(f) it will be seen that the LCN process effectively rotates the vector corresponding to the rising portion of the pixel intensity profile from case A so that it coincides with the vector corresponding to the rising portion of the pixel intensity profile in case B.

Detailed Analysis of the LCN Process

The LCN process can be divided into two main operational phases. In the first phase, the local contrast normalized edge strengths in an imaged scene are calculated. In the second phase, the local contrast normalized edge strength measurements are used to calculate a local contrast normalized focus measurement for the imaged scene.

Figure 6:
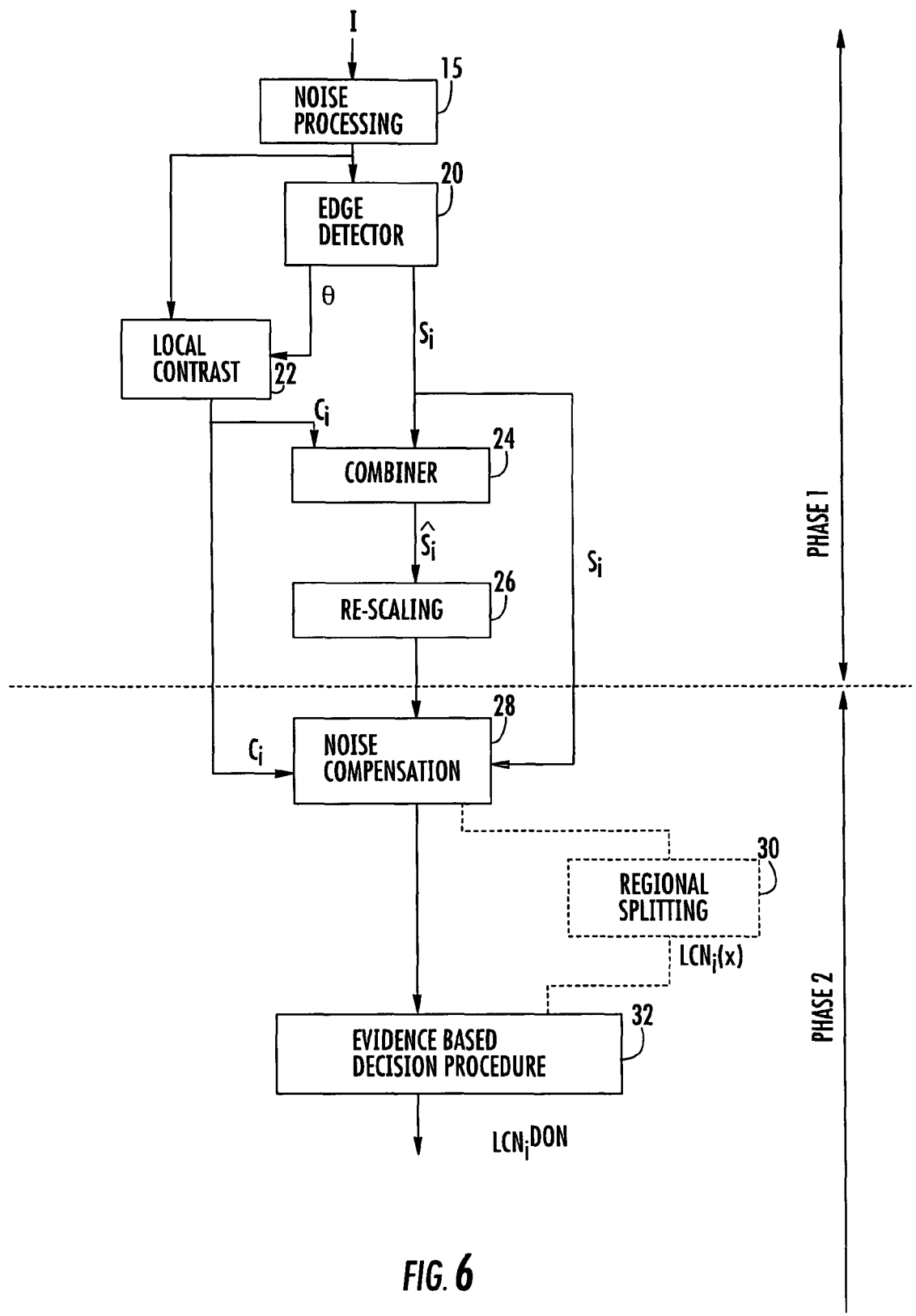
FIG. 6 is a block diagram of the software architecture used in the implementation of the method of determining a focus measure from an imaged scene in accordance with the third and fourth aspect of the invention.

Referring to FIG. 6, the first phase of the LCN process comprises the following major components:

(a) an edge detector 20 which produces an estimate of edge strength $S_i$ and edge direction $\theta$;

(b) a system 22 for calculating local contrast $C_i$ in the direction perpendicular to the edge direction $\theta$ detected by the edge detector 20;

(c) a system 24 for combining the edge strength $S_i$ and local contrast $C_i$ measurements to produce a local contrast normalized edge strength measurement $\hat{S}_i$; and (d) a dynamic range re-scaling mechanism 26 for the local contrast edge strength measurement $\hat{S}_i$ The second phase of the LCN process comprises the following major components: an optional regional splitting system 30; an evidence-based decision procedure 32; and a noise compensation system 28.

The following discussion will be split into two sections reflecting the two operational phases of the LCN process. In particular, the first section will focus on the functioning of the components of the first operational phase of the LCN process in calculating the local contrast normalized edge strengths in an imaged scene. Similarly, the second section will discuss the function of the components of the second operational phase of the LCN process in calculating the local contrast normalized focus measurement of a scene from its local contrast normalized edge strengths.

Phase 1: Calculating Local Contrast Normalized Edge Strengths

Edge Detector 20

The edge detector 20 employed in the LCN process is specifically designed to overcome the problem of edge phasing over pixels. Accordingly, before providing a detailed discussion of the edge detector 20, it is useful to briefly discuss the problem of edge phasing.

Problem of Edge Phasing over Pixels: In practice, it is very rare for a perfect physical edge to be aligned with the boundary of an ideally focused pixel. Instead, it is more likely that the edge will be diffuse in nature and aligned with a point located somewhere within the bulk of the pixel (i.e. not at the pixel boundary). Consequently, depending on the physical positioning of the camera's optics, the light gathered by a pixel may or may not accurately reflect an edge transition.

Figure 7:
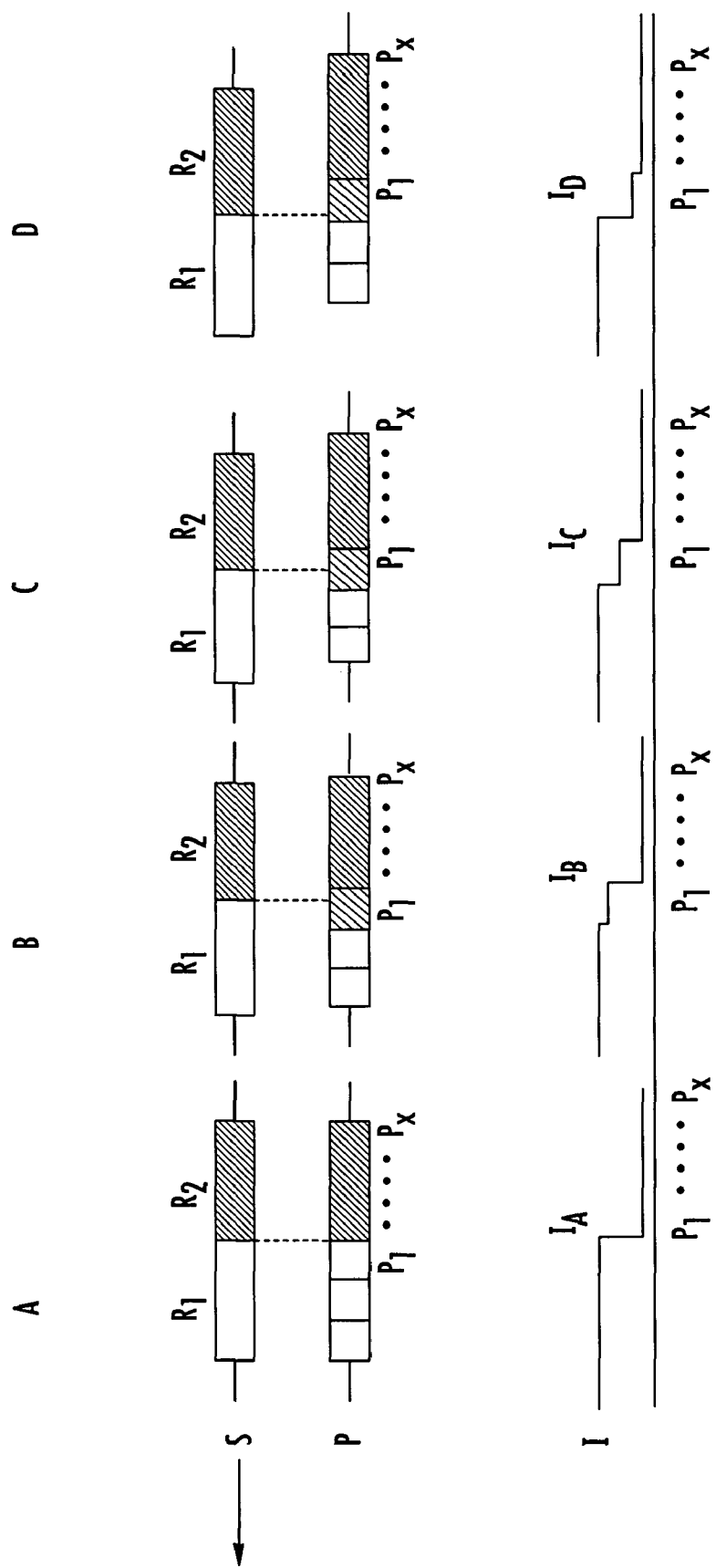
FIG. 7 is a diagram showing the effect of the position of an edge between regions $R_1$ and $R_2$ in an image on the pixel intensity profile of a series of pixels $P_1$ to $P_x$.

FIG. 7 shows an example in which an edge between two regions $R_1$ and $R_2$ in a scene S is moved across pixels $P_1$ to $P_x$ in a pixel array P. Case A refers to the ideal situation where the edge coincides with a boundary of pixel $P_1$ and cases B to D represent the more usual situations where there is an intermediate overlap between an edge and the boundary of a pixel.

In particular, cases B to D respectively show a 25%, 50% and 75% overlap between the edge and the pixel $P_1$. As the edge is moved across pixels $P_1$ to $P_x$, there is a phase transition in the pixel intensity I profile from the pixel array, between a single step profile ($I_A$ in case A) to a multiply stepped profile ($I_B$-$I_D$ in cases B to D respectively) wherein the stepping is particularly extreme when there is a 50% overlap between the edge and pixel $P_1$. Consequently, the LCN process must take into account the phase transitions between the different pixel intensity profiles. Otherwise, the value of the focus measure obtained from the LCN process would be highly susceptible to changes in the physical position of the target relative to the lens module.

Figure 8:
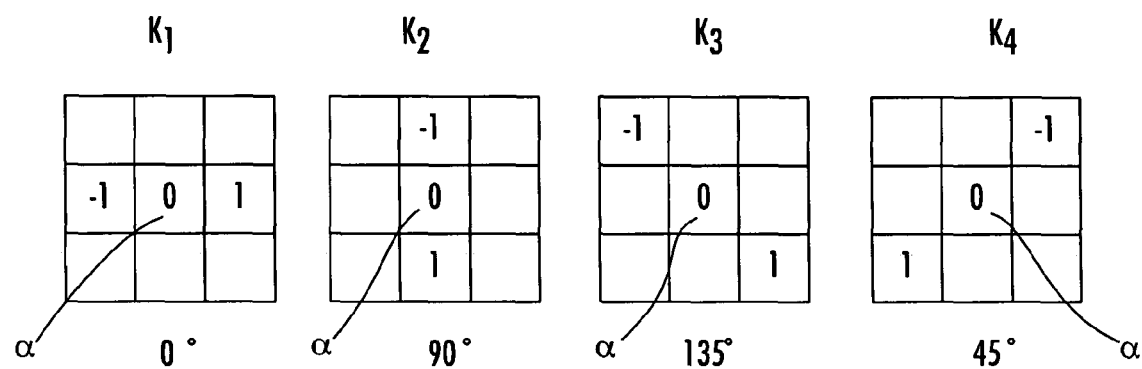
FIG. 8 is a diagram showing the four first order edge-detection kernels employed in the edge detector from the software architecture shown in FIG. 6.

Edge Detector 20: The edge detector 20 employs four first order edge-detection kernels $K_1$, $K_2$, $K_3$ and $K_4$ as shown in FIG. 8. The kernels $K_1$, $K_2$, $K_3$ and $K_4$ are selected to reflect four possible orientations of an edge in a scene, namely horizontal (0°), vertical (90°) and diagonal orientations (45° and 135°) and thereby provide a response to such edges.

It will be noted that the central element γ is zero in each kernel $K_1$, $K_2$, $K_3$ and $K_4$. This ensures that the pixel over which an edge is located is omitted from edge-strength calculations and thus does not contribute to the stepping of the intensity profile from the pixel array P.

In use, the first order edge-detection kernels $K_1$, $K_2$, $K_3$ and $K_4$ are convolved along slices of an image with each slice being three rows deep to accommodate the vertical and diagonal kernels $K_2$, $K_3$ and $K_4$. Accordingly, the edge-strength values produced from the convolution provide a measure of the edge-strength of each and every pixel on the slice. However, for the purposes of determining a focus measure, it is useful to obtain a single edge strength measure for an edge. Consequently, the maximum edge strength measured from all of the pixels positioned in the vicinity of an edge is used as a local measure of the strength of the edge.

Figure 9:
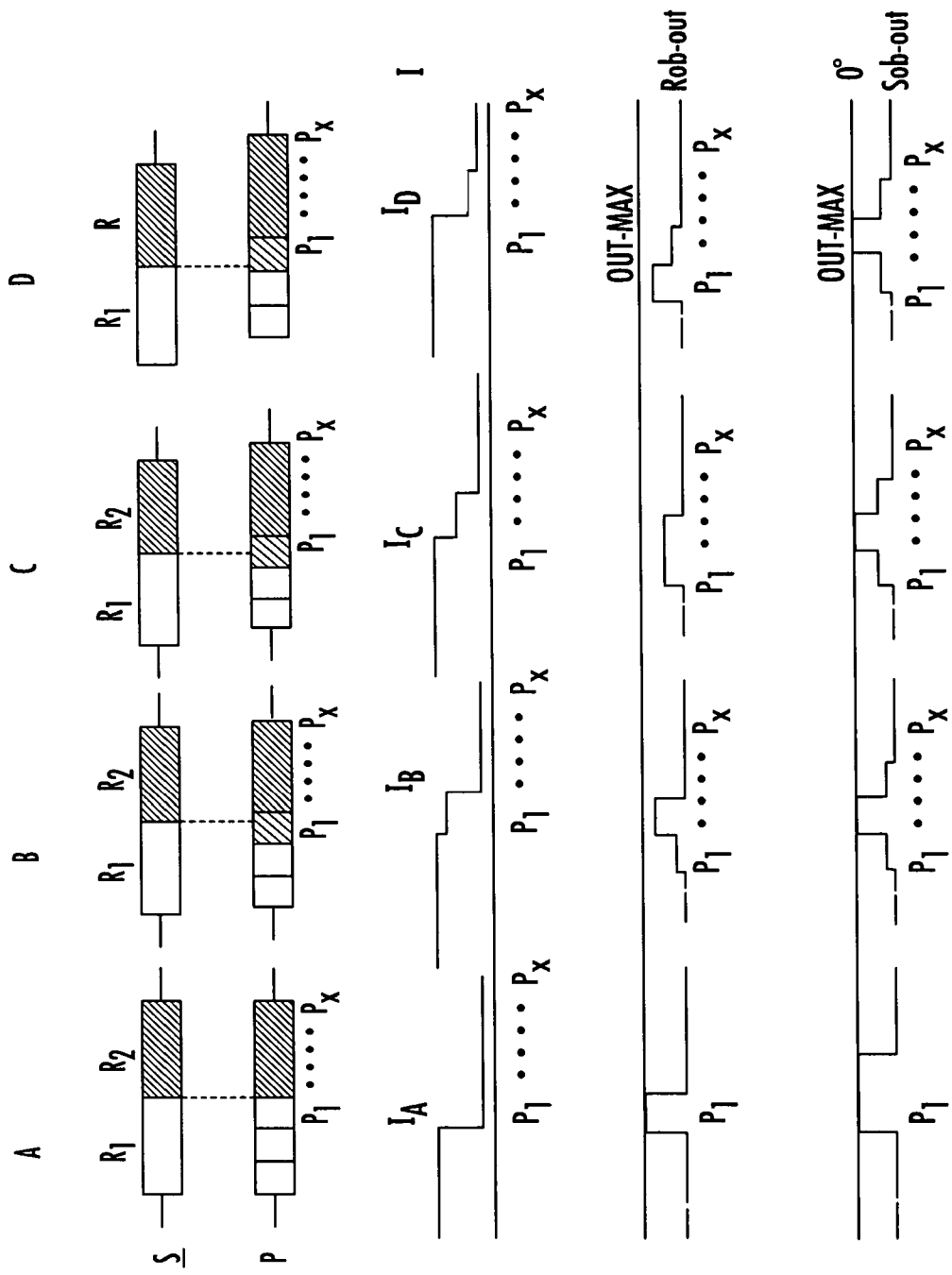
FIG. 9 is a diagram showing the effect of a Roberts Edge detector and a horizontal (0°) first order edge-detection kernel on the pixel intensity profile of a series of pixels $P_1$ to $P_x$ in a pixel array P, as a function of the position of an edge between regions $R_1$ and $R_2$ in an image, relative to the pixel array.

Referring to FIG. 9, as previously discussed in relation to FIG. 7, if an edge between two regions $R_1$ and $R_2$ in a scene S is moved across pixels $P_1$ to $P_x$ in a pixel array P, the pixel intensity I from the array undergoes a phase transition from a single step profile (where the edge coincides with a pixel boundary [Case A]) to a multiply stepped profile (where there is a partial overlap between the edge and a pixel [Cases B to D]).

If the pixel intensity profile I is convolved with a conventional Roberts detector (i.e. a −1, +1 kernel) the resulting output Rob_out possesses a peak-shaped or stepped peak shaped profile depending on the degree of overlap between the edge and a pixel. However, it should also be noted that the peaks in the output from the Robert's detector (Rob_out) also vary in amplitude depending on the degree of overlap between the edge and a pixel. In particular, when the edge between regions $R_1$ and $R_2$ is 50% overlapped with pixel $P_1$ (i.e. case C) the output from the Roberts detector (Rob_out) has a peak amplitude of 50% of the peak amplitude (Out_max) generated during the ideal condition (i.e. when the edge between $R_1$ and $R_2$ coincides with the boundary of the pixel $P_1$).

In contrast, when the horizontal first order edge-detection kernel $K_1$ is convolved with the pixel intensity profile I, the resulting output Sob_out has a peak shaped profile of fixed maximal amplitude (equal to the amplitude Out_max produced in the ideal case where the edge coincides with the boundary of the pixel $P_1$). Furthermore, the peak amplitude is correctly located at the pixel over which the edge is actually disposed.

As will be recalled, the convolution of the first order edge-detection kernels $K_1$, $K_2$, $K_3$ and $K_4$ with the pixel intensity profile (I) produces an edge strength measure for each pixel in the pixel array. However, it will further be recalled that the maximum edge strength measured from the pixels in the vicinity of an edge is used as the local measure of the strength of the edge. Accordingly, the peak amplitude from the convolution of the intensity profile (I) from the pixel array P with the first order edge-detection kernels $K_1$, $K_2$, $K_3$ and $K_4$ provides a mechanism for determining the location of the edge and its local edge strength. Furthermore, the four first order edge-detection kernels $K_1$, $K_2$, $K_3$ and $K_4$ effectively limit the rising portion of the pixel intensity profile (I) to four cardinal directions and thereby provides a rough delimiter on the angle θ formed between the rising portion of the pixel intensity profile and the base of the pixel intensity profile.

In summary, the use of the four first order edge-detection kernels $K_1$, $K_2$, $K_3$ and $K_4$ provides a mechanism of obtaining a rough estimate of the direction of an edge and further enables the LCN process to avoid the computationally demanding trigonometric and square root calculations that would otherwise be required to calculate the strength of the edge.

System for Calculating Local Contrast 22

The basic premise of the LCN process is that an edge of given sharpness in an image should yield a fixed focus measurement, regardless of whether the edge was brightly illuminated or shadowed in the original scene. Local contrast is determined by assessing the maximum and minimum pixel intensity over a restricted region in the vicinity of an edge. The restricted region is known as a neighborhood and comprises a number of pixels on either side of a central pixel. The central pixel itself is not included in the neighborhood in order to reduce the effects of noise.

To obtain a meaningful local contrast estimate, local contrast is calculated for every pixel in the direction perpendicular to the edge direction. In other words, the local contrast of an edge between a bright and dark region in an image is obtained by measuring the difference between the pixel intensity in the dark and bright regions on either side of the edge. As will be recalled, the four first order edge-detection kernels $K_1$, $K_2$, $K_3$ and $K_4$ used in the edge detector 20 provided a rough estimate of the direction θ of a detected edge. Accordingly, local contrast is measured in the direction perpendicular to the edge direction θ provided by the edge detector 20.

Figure 10:
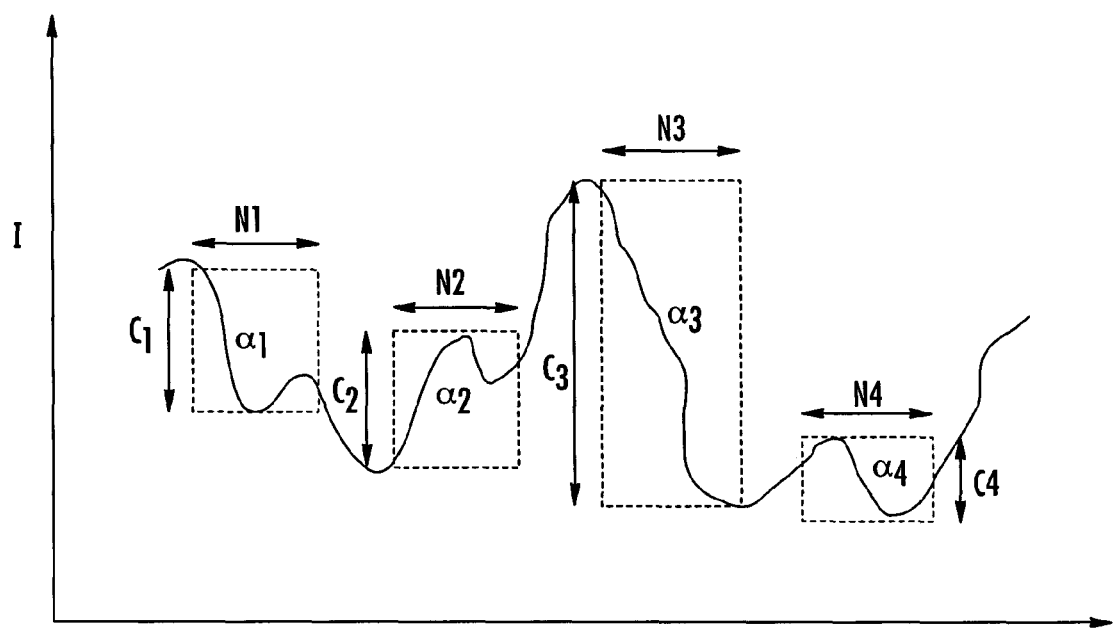
FIG. 10 is a graph showing the mechanism by which a local contrast measure is calculated from the pixel intensity profile generated in response to an imaged scene.

FIG. 10 shows the operation of the local contrast measurement procedure in more detail. In particular, FIG. 10 shows an example of a pixel intensity profile (I) measured along a slice of an image scene. For the sake of clarity, in the present example, the local contrast measure is shown as being calculated for only four points ($\alpha_1$, $\alpha_2$, $\alpha_3$ and $\alpha_4$ along the pixel intensity (I) profile. However, it will be appreciated that normally the local contrast measure is calculated for each edge detected along an image slice by the edge detector 20.

Returning to the present example, each of the four points ($\alpha_1$, $\alpha_2$, $\alpha_3$ and $\alpha_4$) has an associated neighborhood $N_1$, $N_2$, $N_3$ and $N_4$ comprising a fixed number (n) of pixels on either side of each point $\alpha_i$. For any given point $\alpha_i$, the local contrast around $\alpha_i$ (i.e. $C(\alpha_i)$) is defined as the difference between the maximum and minimum pixel intensity value in its neighborhood $N_i$. Referring to FIG. 10, the width of the dotted line boxes surrounding points $\alpha_1$, $\alpha_2$, $\alpha_3$ and $\alpha_4$ corresponds with the size of the neighborhood $N_1$, $N_2$, $N_3$ and $N_4$ around each point $\alpha_1$, $\alpha_2$, $\alpha_3$ and $\alpha_4$. The height of the dotted line boxes surrounding points $\alpha_1$, $\alpha_2$, $\alpha_3$ and $\alpha_4$ corresponds with the local contrast detected at points $\alpha_1$, $\alpha_2$, $\alpha_3$ and $\alpha_4$. In more general terms, if we assume that the neighborhood of any given pixel $P_i$ comprises $\chi=2n$ pixels, and $I(P_i)$ represents the intensity of the pixel $P_i$, the range or local contrast $C_i$ around pixel $P_i$ can be defined as $$C_i = \text{Max}|I(P_{i-n}), \ldots, I(P_{i-1}), I(P_{i+1}), \ldots I(P_{i+n})| - \text{Min}|I(P_{i-n}), \ldots, I(P_{i-1}), I(P_{i+1}), \ldots I(P_{i+n})| \quad (1)$$

The choice of neighborhood size $\chi$ depends on the target scene. In particular, the neighborhood must be wide enough to traverse both the object and background as delineated by the detected edge. However, the neighborhood must also be narrow enough to avoid global illumination effects, such as lens vignetting or shading. Similarly, the neighborhood must be narrow enough to avoid neighboring objects or edges in the scene.

In practice a neighborhood of three or four pixels on either side of a candidate edge is normally used. However, the size chosen for the neighborhood generally depends on the feature-size apparent in the scene.

System for Combining Edge Strength and Local Contrast Measurements 24

Assuming that $S_i$ and $C_i$ respectively represent the edge strength and local contrast measured at position i on a slice, the local contrast measure can be used to normalize the edge strength measurements as follows $$\hat{S}_i = \frac{S_i}{C_i} \quad (2)$$

wherein, $\hat{S}_i$ represents the local contrast normalized edge strength at position i on the slice.

Accordingly, using the local contrast normalized edge strength measurement $\hat{S}_i$, the same degree of focus can be determined for any given scene under different lighting conditions (i.e. is tolerant to cross-scene illumination variation).

Dynamic Range Re-Scaling Mechanism 26

Figure 11:
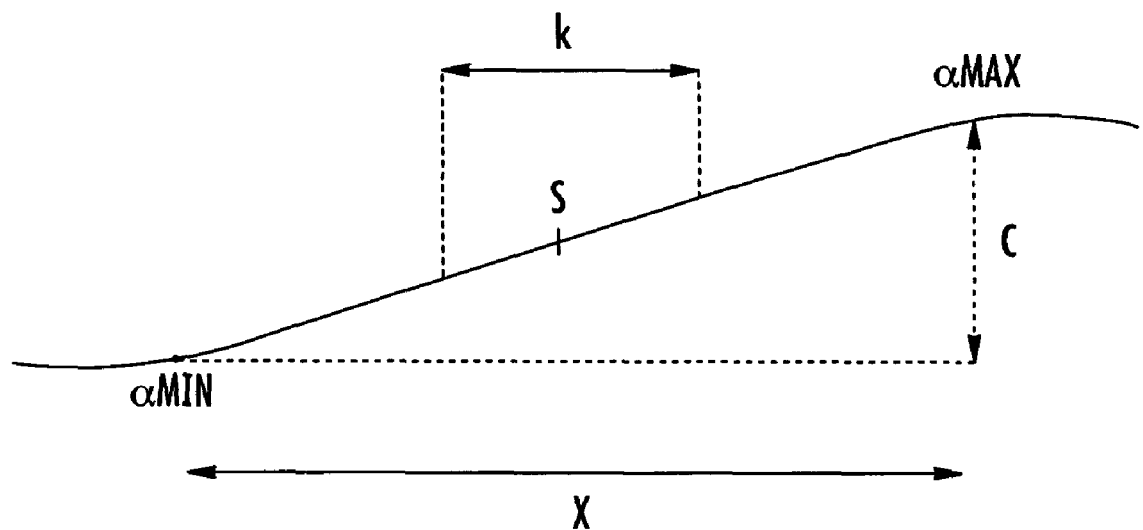
FIG. 11 is a graph of the local contrast measure (obtained using a local contrast neighborhood of size $\chi$) and edge strength measurement (obtained using a kernel of size k) obtained from a pixel intensity profile.
Figure 11:
Figure 11:
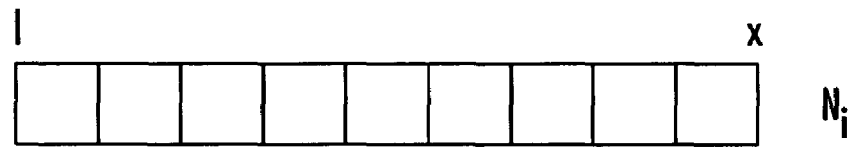

There are two problems with the above-described local contrast normalization scheme. The first problem arises because there is a limit on the minimum edge-strength detectable using the LCN process described so far. In particular, referring to FIG. 11 and assuming that an edge of strength S has been detected using a kernel $K_i$ of width k, and a local contrast range of C over a neighborhood $N_i$ of width $\chi$, the lower limit on the edge strength S detectable for a diffuse edge is given by $$S_{min} = \frac{k * C}{\chi} \quad (3)$$

However, since the normalized edge strength is calculated by dividing by C, the minimum detectable normalized edge-strength is $$\hat{S}_{min} = \frac{k}{\chi} \quad (4)$$

Thus, while the dynamic range of the normalized edge strength measure should ideally be 0 to 1, in the present case, the normalized edge strength measure ranges from k/χ to 1. Furthermore, it will be noted that the actual value of the lower limit on the normalized edge strength depends on the operating conditions of the LCN process (i.e. the choice of the kernel size k and/or local-contrast neighborhood size χ).

The second problem arises when an edge is extremely diffuse as a result of poor focusing. In particular, when an edge is so blurred that it is wider than the local-contrast neighborhood N, the local contrast normalized edge-strength $\hat{S}_i$ can be over-estimated.

If the slope of a diffuse edge is defined as $$S_{diffuse} = \frac{C}{\chi} \quad (5)$$

it can be said that any edge detected within the local-contrast neighborhood that has a slope close to, or equal to, $S_{diffuse}$ is likely to be part of a diffuse edge. Similarly, an edge that has a slope that is greater (or much greater) than $S_{diffuse}$ is not diffuse and is contained entirely within the local-contrast neighborhood.

The above approach of identifying a diffuse edge provides no information regarding the width of the edge. Indeed, the only certainty provided by this approach is that the diffuse edge is at least the same width as the local-contrast neighborhood $N_i$. One way of overcoming this problem and determining the width of a diffuse edge would be to increase the width χ of the local-contrast neighborhood N. However, this would require the inclusion of more rows of pixels (i.e. to accommodate the first order edge-detection kernels) into the image slice processed by the edge detector 20. Rather than taking this approach, the dynamic range re-scaling mechanism 26 weights edges with a slope of similar value to $S_{diffuse}$. The dynamic range re-scaling mechanism 26 further rescales the resulting edge-strength measurements to remove the above-mentioned limit $S_{min}$.

In particular, the present invention employs a similarity function that is unity for the sharpest edge in an image and zero (or less than zero) for an edge whose slope equals or closely approximates $S_{diffuse}$. In particular defining the edge-slope as $$S_{edge} = \frac{S}{k} \quad (6)$$

then $$\frac{S_{edge}}{S_{diffuse}} = \frac{S*\chi}{C*k} \quad (7)$$

The sharpest edge is obtained where C=S and thus $S_{edge}/S_{diffuse}=\chi/k$. Accordingly, the range of $S_{edge}/S_{diffuse}$ is 1 to $\chi/k$.

To rescale the $S_{edge}/S_{diffuse}$ function to the desired range of 0 to 1, the following similarity function is used.

$$F = \frac{\left(\frac{S*\chi}{C*k} - 1\right)}{\left(\frac{\chi}{k} - 1\right)} = \frac{S*\chi - C*k}{C*\chi - C*k} \quad (8)$$

From the above expression it can be seen that as the edge strength S decreases from its maximum value (i.e. C), the weighting factor F varies from 1 to 0. If $$S < \frac{k*C}{\chi}$$

the weighting factor F becomes negative with its maximal negative value being $$-\frac{k}{\chi - k}.$$

Accordingly, the complete local contrast normalized focus measurement $\hat{S}^*_i$ can be defined in terms of the above similarity function as follows.

$$\hat{S}^*_i = G_i = \left(\frac{S}{C}\right) * \frac{\left(\chi - \frac{C*k}{S}\right)}{(\chi - k)} \quad (9)$$

The above expression can be further simplified as follows:

$$W_i = \frac{\left(\chi - \frac{C*k}{S}\right)}{(\chi - k)} \quad (10)$$

Wherein $$\hat{S}^*_i = \hat{S}_i W_i \quad (11)$$

From this it can be seen that the local contrast normalized focus measure $\hat{S}^*_i$ is comprised of two parts, namely the local contrast normalized edge-strength $\hat{S}_i$ and a weighting function $W_i$. It should be noted that $W_i$ is 0 when $S=S_{min}=k*C/\chi$ and is unity when $S=S_{max}=C$.

Phase 2: Determining the Local Contrast Normalized Focus Measurement

The LCN process employs the local contrast normalized edge strength measurements previously calculated to calculate a local contrast normalized focus measurement from an imaged scene. However, not all of the local contrast normalized edge strength measurements determined from a scene provide a useful representation of the focus of the scene. For instance some of the edge strengths may represent noise in the image or arise from the shape of the imaged object. To overcome this problem, the LCN process selects the strongest and most frequently occurring edge strengths in a scene to calculate the local contrast normalized focus measurement. In particular, the LCN process employs the noise compensation procedure and evidence-based decision procedure to select local contrast normalized edge strength measurements from a scene from which to calculate the local contrast normalized focus measurement.

Nonetheless, it will be appreciated that local contrast edge strength measurements may be used for other purposes than calculating focus measurements. Some of these other applications of the local contrast normalized edge strength measurements are discussed later in this document. For these other applications, other criteria may be used for selecting appropriate local contrast normalized edge strength measurements.

Noise Compensation System (28)

Overview: There are many potential sources of noise in an image (e.g. photon shot noise, thermal noise, on-chip electronic noise, KTC Noise etc.). Although steps can be taken to reduce such noise it can never be totally eliminated from an image.

To compensate for the effect of image noise, the LCN process employs two different thresholding techniques to select edge strength measurements for use in calculating the local contrast normalized focus measure as follows:

(a) selecting only those rescaled local contrast normalized edge strengths $\hat{S}^*_i$ in a slice that exceed a pre-defined proportion γ of the largest maximum rescaled local contrast normalized edge strength ($\hat{S}^*_{max}$) in the slice; and (b) selecting only those edges in a slice whose local contrast ($C_i$) exceeds the minimum local-contrast ($C_{min}$) in the slice.

Both of these noise compensation mechanisms are examined in more detail below.

Selecting Edge Strengths that Exceed a Proportion of the Maximum Edge Strength in a Slice Noisy pixel intensity measurements can cause particular problems for edge-detection methods based on the detection of differences between the intensities of adjacent pixels, because some of the inter-pixel intensity differences may be solely attributed to image noise. Phantom edges are edges detected by an edge detection process that are not actually present in the scene. Phantom edges typically have a very low edge-strength. Indeed the maximum edge-strength of a phantom edge is generally equal to twice the overall noise-level in the image.

To avoid the inclusion of phantom edges in the local contrast normalized focus measure, in a first step the rescaled local contrast normalized edge strength value $\hat{S}^*_i$ at each pixel $P_i$ along a slice is calculated. In the second step, the overall maximum rescaled local contrast normalized edge strength $\hat{S}^*_{max}$ across the entire slice is calculated from all the rescaled local contrast normalized edge strength measurements $\hat{S}^*_i$. A threshold for selecting edge strength measurements from a given slice is determined using a predefined proportion γ of the overall maximum rescaled local contrast normalized edge-strength $\hat{S}^*_{max}$ of the slice. When the rescaled local contrast normalized edge-strength $\hat{S}^*_i$ of a pixel $P_i$ is below the threshold, the edge is not included in the subsequent evidence-based decision procedure 32. Thus, the decision process for the threshold can be described mathematically as follows:

$$\hat{S}^*_i = \begin{vmatrix} \hat{S}^*_i & (\hat{S}^*_i \geq \gamma * \hat{S}^*_{max}) \\ 0 & (\hat{S}^*_i < \gamma * \hat{S}^*_{max}) \end{vmatrix} \quad (12)$$

This noise compensation mechanism is based on the assumption that the correct focus value for a scene is given by the strongest edges in that scene. Accordingly, this noise compensation mechanism ensures that only the strongest edges in an image are used to determine the local contrast normalized focus.

Selecting Edges from a Slice Whose Contrast Exceeds a Minimum Threshold

A main assumption of the LCN process is that local contrast can be measured accurately using a fixed size neighborhood. However, this is not always the case and sometimes the choice of a particular neighborhood size may affect the accuracy of a local contrast measurement.

In the absence of a good estimate of the local contrast $C_i$ of an edge, it is not generally possible to obtain an accurate local contrast normalized focus measure $LCN_i$. In order to prevent such inaccurate focus measurements from being included in the calculations of the dominant focus value of a scene, a minimum contrast threshold $C_{min}$ is defined. Accordingly, any edges whose local contrast $C_i$ is less than the minimum contrast threshold $C_{min}$, are not included in the evidence-based decision procedure 32.

The decision rule underlying this thresholding action can be described as follows:

$$C_i = \begin{vmatrix} C_i & (C_i \geq C_{min}) \\ 0 & (C_i < C_{min}) \end{vmatrix} \quad (13)$$

Where $C_i$ is the local contrast at position i on a slice.

The requirement for the above threshold is brought about by the arithmetic of normalization. In particular, since normalization is effectively a division operation using the contrast range, if the contrast range is small, then noise can have a significant effect on the local contrast measurement. For example, if an image possesses a noise level of ±2, the variation on the contrast range calculation would be ±4. If the range is 10, then the noise is approximately 40% of the range. If the edge strength is also 10 (i.e. is a perfect edge) our focus measurement could range from 10/6 (1.67) to 10/14 (0.71). Accordingly, larger ranges provide more accurate focus measurements that are less affected by noise.

In addition, as described above, the noise content of an image can be reduced by increasing the number of edges (size of the region) used for making the evidence-based decision method (whilst ensuring that the region is not so large that smearing occurs). In this case, the signal to noise ratio improves in accordance with the inverse square root of the number of edges.

Returning to FIG. 6 it will be noted that a further noise pre-processing step 15 can be performed before the operation of the edge detection process 20.

Evidence-Based Decision Procedure 32

Limitation of the LCN Process so far: The multiple local contrast normalized edge strength measurements provided by the previous calculations are subject to the effects of the shape of an imaged object. While localized averaging can be used to produce a single local contrast normalized focus value (Foc), the averaging process can cause problems itself when a scene contains multiple objects positioned at different distances from the camera. Both of these issues will be discussed in more detail below.

Effects of the Shape of an Imaged Object on $LCN_i$

The LCN process described so far produces a local contrast normalized edge strength value for each and every edge in a scene. However, in a typical scene there may be several edges. As will be recalled, if the edges are derived from objects positioned at equal distances from the camera, then all the edges should possess the same objective focus. However, in practice the shape of an object can affect edge-strength and thus the local contrast normalized focus measurements produced by the LCN process.

Figure 4:
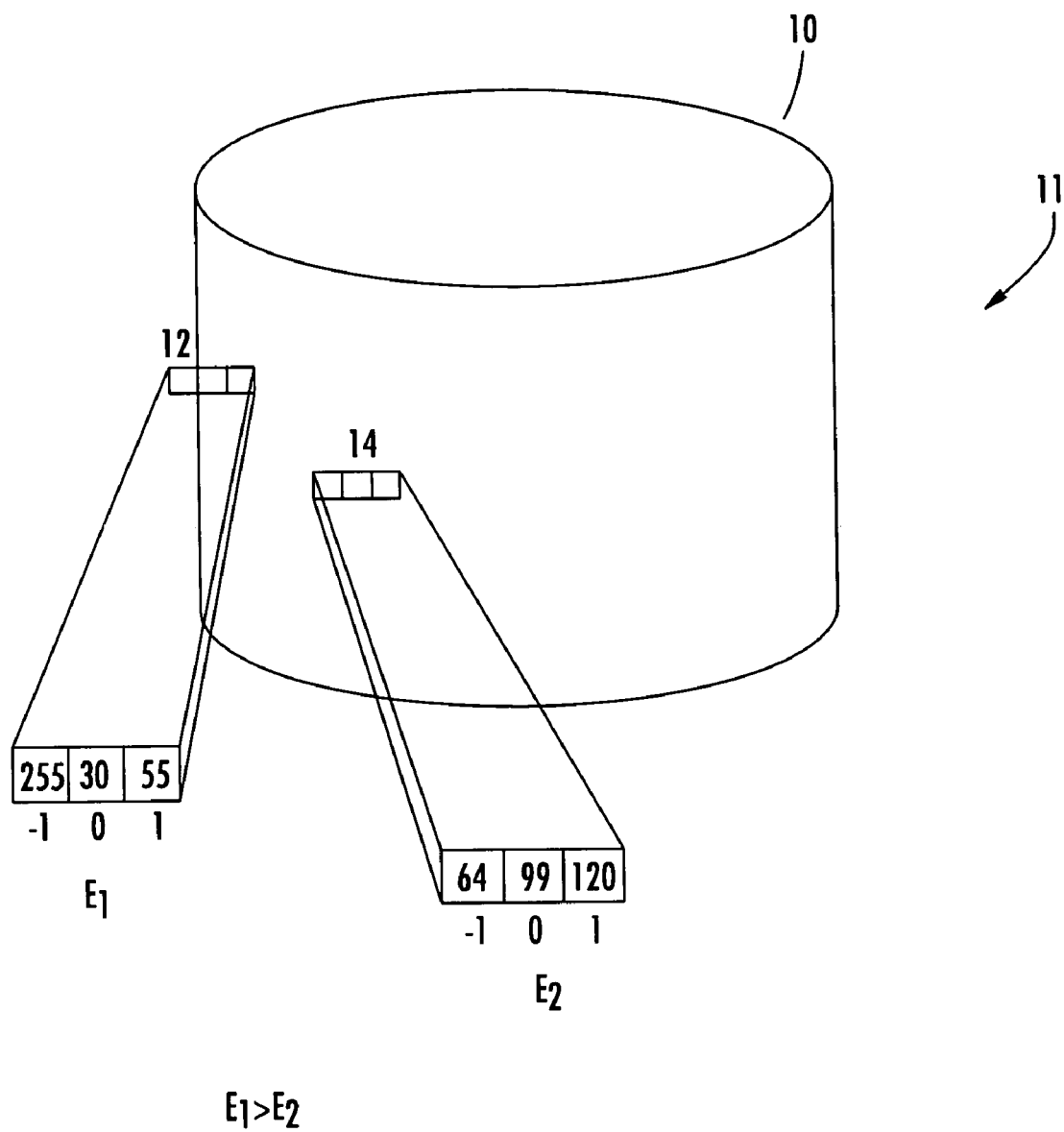
FIG. 4 is an image of a cylindrical object against a background and sections taken thereof.

Returning to the block diagram of the components of the LCN process depicted in FIG. 6 and the example of the cylindrical object depicted in FIG. 4, when the edge detector 20 has processed the image of the object 10 and its background 11, two different edge-strengths are produced for the sections 12, 14. Even after normalization by the local-contrast $C_i$, the two sections 12, 14 produce differing rescaled local edge normalized strength values $\hat{S}^*_i$.

More generally, a slice across an image covering a region of interest may traverse several edges. One approach to producing a single focus measurement (Foc) that encompasses a range of edges is to sum and average over the number of edges considered. Furthermore, if the average is calculated over several adjacent rows from an image, an overall local contrast normalized focus measure (Foc*) can be determined.

While this approach provides an average figure for the local contrast normalized focus over a region, nonetheless, being an average focus measure, Foc* does not differentiate between strong and weak edges. Furthermore, the averaging process includes edge information from regions of the image where: there are no significant edges present; or the local contrast $C_i$ is too poor to provide a noise-free measurement.

In addition, the process of averaging edge strength values adversely affects the ability of the LCN process to produce a focus measure that is repeatable from one scene to another for an equivalent objective focus.

Problem of Multiple Objects Positioned at Different Distances from a Camera

As will be recalled, if a scene contains objects positioned at different distances from the camera, the focus of each of the objects should be different. Using the above approach of averaging local contrast normalized edge strength measurements $\hat{S}^*_i$, the resulting value of the local contrast normalized focus measurement (Foc*) would be likely to be incorrect for some if not all of the objects in the scene. One method of overcoming this problem would be to segment each object in the scene and collate the local contrast normalized focus measurements for each object. However, such generalized object segmentation does not lend itself to in-stream processing of pixel data.

Figure 12:
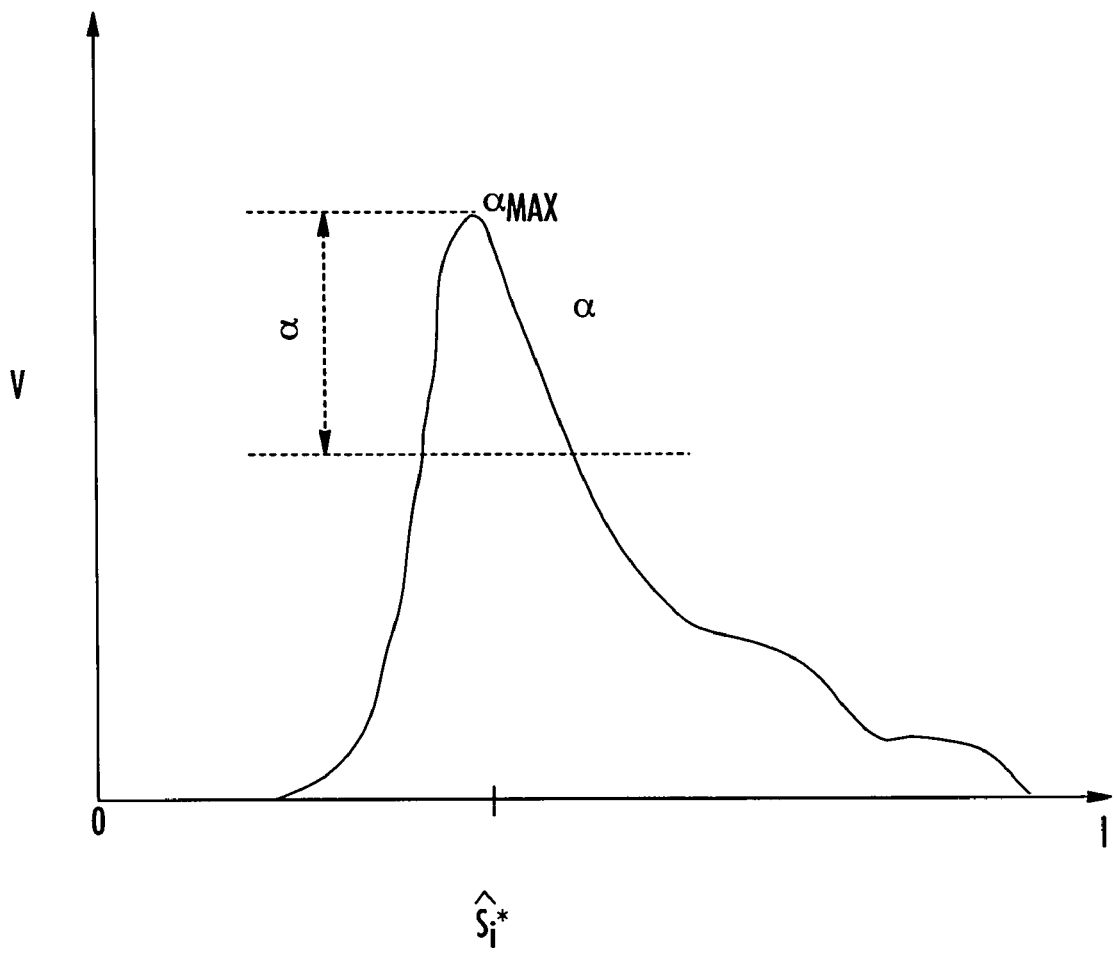
FIG. 12 is a histogram of the rescaled local contrast normalized edge strength measurements $\hat{S}^*_i$ obtained from an imaged scene.

Principles of Operation of Evidence-Based, Decision Procedure 32: The evidence-based decision procedure represents a compromise between full object segmentation and blind averaging. Referring to FIG. 12, a histogram is generated from all the rescaled local contrast normalized edge strength measurements $\hat{S}^*_i$ in a region from an image. This enables the focus value (Foc) in the region to be determined without averaging over all the local contrast normalized edge strength measurements therein. In particular, only those rescaled local contrast normalized edge strength measurements $\hat{S}^*_i$ that are within some percentage γ of the amplitude $α_{max}$ of the main peak α are used to calculate the local contrast normalized focus value of the region. More specifically, the local contrast normalized focus measurement (Foc) for the region is defined as the center of mass of the rescaled local contrast normalized edge strength measurements that are within a percentage γ of the amplitude of the main peak.

In effect, the evidence-based decision procedure ensures that any averaging is limited to edge strengths for which there is comparable evidence (i.e. of comparable height (frequency of occurrence) to the main peak α). In this way minor peaks are discarded as either noise or secondary objects in the scene. It should be noted that the amplitude of the main peak α is only used to select edge strength values to determine a representative focus value for a scene and accordingly, does not itself provide the local contrast normalized focus measurement.

Figure 13:
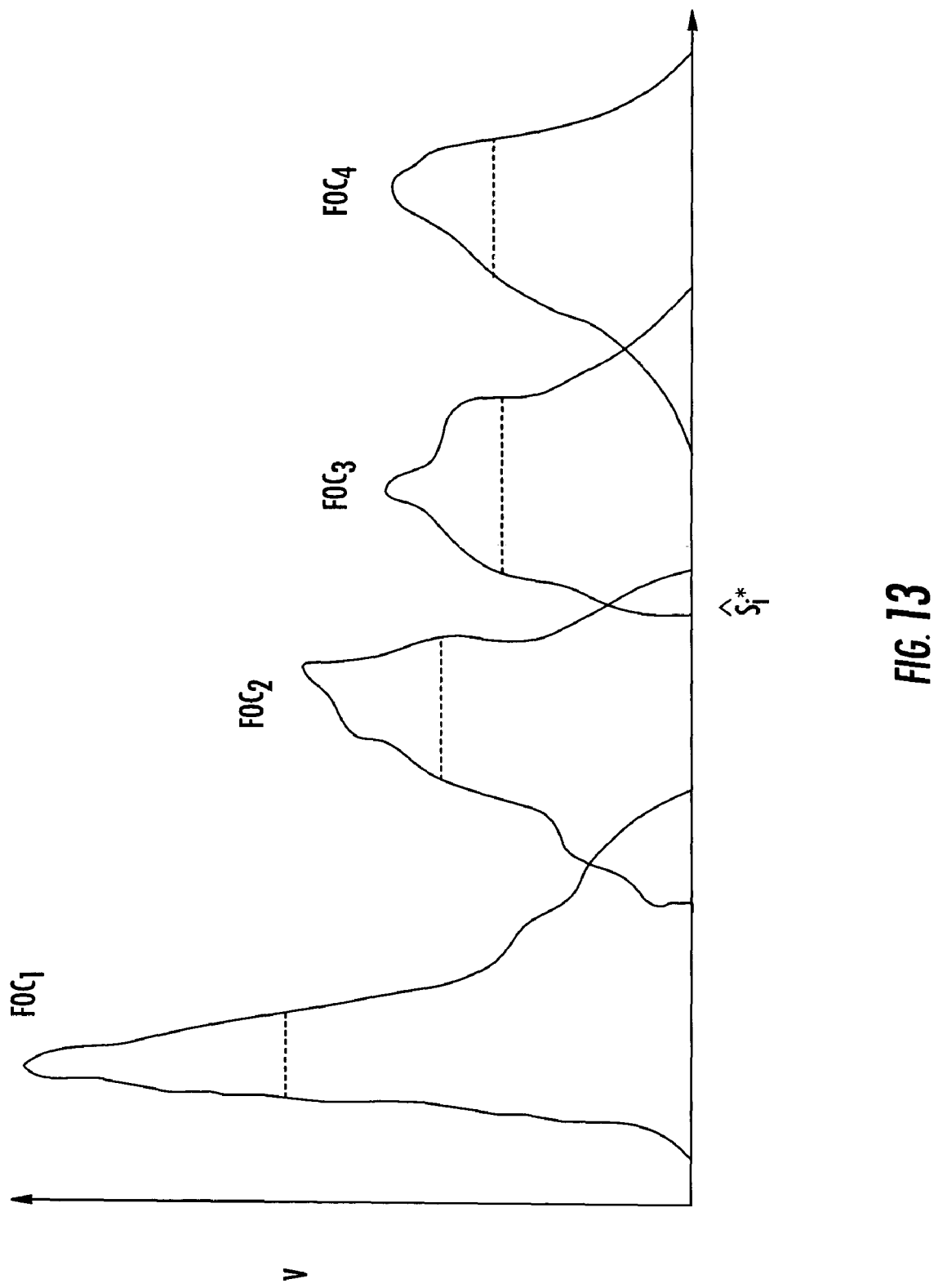
FIG. 13 is a graph of histograms of rescaled local contrast normalized edge strength measurements $\hat{S}^*_i$ generated at different stages of auto-focusing.

As an aside, and referring to FIG. 13, it should be noted that as the objective focus of a scene improves during auto-focusing, the histogram associated with a particular focusing condition $Foc_j$ (j=1 to 4 in the present example) moves toward the right of the frequency-focus measurement space, with the optimal focus occurring at the very right of the plot ($Foc_4$).

Optional Regional Splitting System (30)

The above evidence-based decision procedure 32 restricts the degree of averaging used to obtain a local contrast normalized focus value (Foc) and thus to some extent ensures that only those edge-strength measurements that appear most frequently in a scene are included in the focus value measurement. Nevertheless, even the limited degree of averaging provided by the above evidence-based decision procedure 32 can lead to a "smearing" of the focus measurement.

One method of overcoming this problem is to divide a scene into a plurality of regions and derive a local contrast normalized focus measurement for each region. One of the distinguishing features of the absolute focus metric compared with traditional relative focus measurements is that it allows for such regional comparisons. A further reason for splitting the scene into multiple regions is to limit the smearing of the local contrast normalized focus measurement caused by other factors such as the lens. Both of these issues will be discussed in more detail below.

Comparing Regions of a Scene Comprising Objects Positioned at Different Distances from a Camera The evidence-based decision procedure 32 is particularly useful when multiple regions of an imaged scene are to be compared. As before, a histogram is generated from all the rescaled local contrast normalized edge strengths $\hat{S}^*_i$ in each region and the local contrast normalized focus measurement (Foc) for the region is calculated therefrom. However, in this case, the local contrast normalized focus measurements from each region are directly compared to determine the region with the best focus.

Using the evidence based decision procedure 32, the accuracy of the local contrast normalized focus measurement should in principle become more accurate as the size of the region examined decreases. However, since a smaller region presents fewer edges from which measurements can be made, the local contrast normalized focus measurement generated from smaller regions is more susceptible to noise. Accordingly, a compromise must be achieved between reducing region size to focus on single scene objects (and thereby avoid averaging), and enlarging regions to provide sufficient edges for robust local contrast normalized focus measurements Foc.

In practice, the choice of region size is likely to be dictated by the goal of the focusing operation and the type of scene being imaged. For instance, if taking a picture of a page of text, it may be useful to use only a single region, whereas if the picture is of a scene with multiple details (or a landscape that has foreground objects) then a finer grained region sampling may be more appropriate.

Effect of Lens Performance on Local Contrast Normalized Focus Measurement

Figure 14:
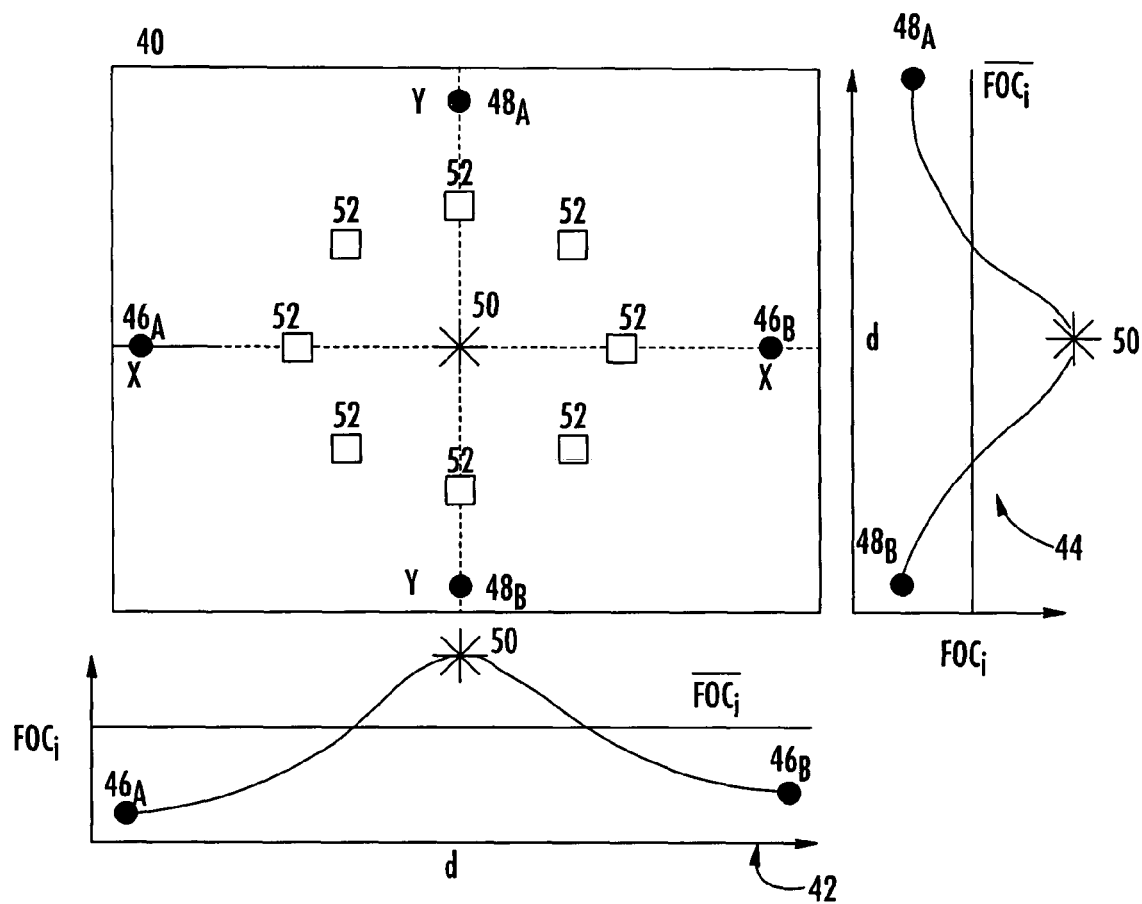
FIG. 14 is a diagram showing the variation of the rescaled local contrast normalized edge strength measurements $\hat{S}^*_i$ with distance along the X-X and Y-Y axis of an image and further showing optimal sampling positions thereon.

Turning to FIG. 14, graphs 42 and 44 disposed along the sides of an image 40, respectively show the variation of the local contrast normalized focus measurement ($LCN_i$) with distance (d) along the X-X axis and Y-Y axis in image 40. Normally the focus of a lens is poorer at the edge of an imaged scene ($46_A$, $46_B$, $48_A$ and $48_B$) than in the middle 50. Accordingly, the variation in the focus of a lens typically demonstrates a bell-shaped profile along the horizontal (X-X) and vertical (Y-Y) axes as shown in graphs 42 and 44.

Consequently, if a single region were to be selected from a scene to calculate the local contrast normalized focus value for the entire scene, the resulting focus value would not represent the variation in focus values across the entire scene.

By selecting a number of regions in the scene, calculating the local contrast normalized focus values for each of these regions and averaging the focus values, an intermediate focus value 52 (between the best focus values 50 and the worst ($46_A$, $46_B$, $48_A$ and $48_B$) focus values) is obtained.

Applications of the LCN Process

By its nature, the LCN process can be readily implemented in circuit and in particular in an integrated circuit and is applicable to a broad range of devices including digital cameras and mobile phones incorporating a digital camera. These devices and other applications of the LCN process will be described below. However, it will be appreciated that the person skilled in the art may employ standard techniques to implement the invention in these and other ways.

Figure 15:
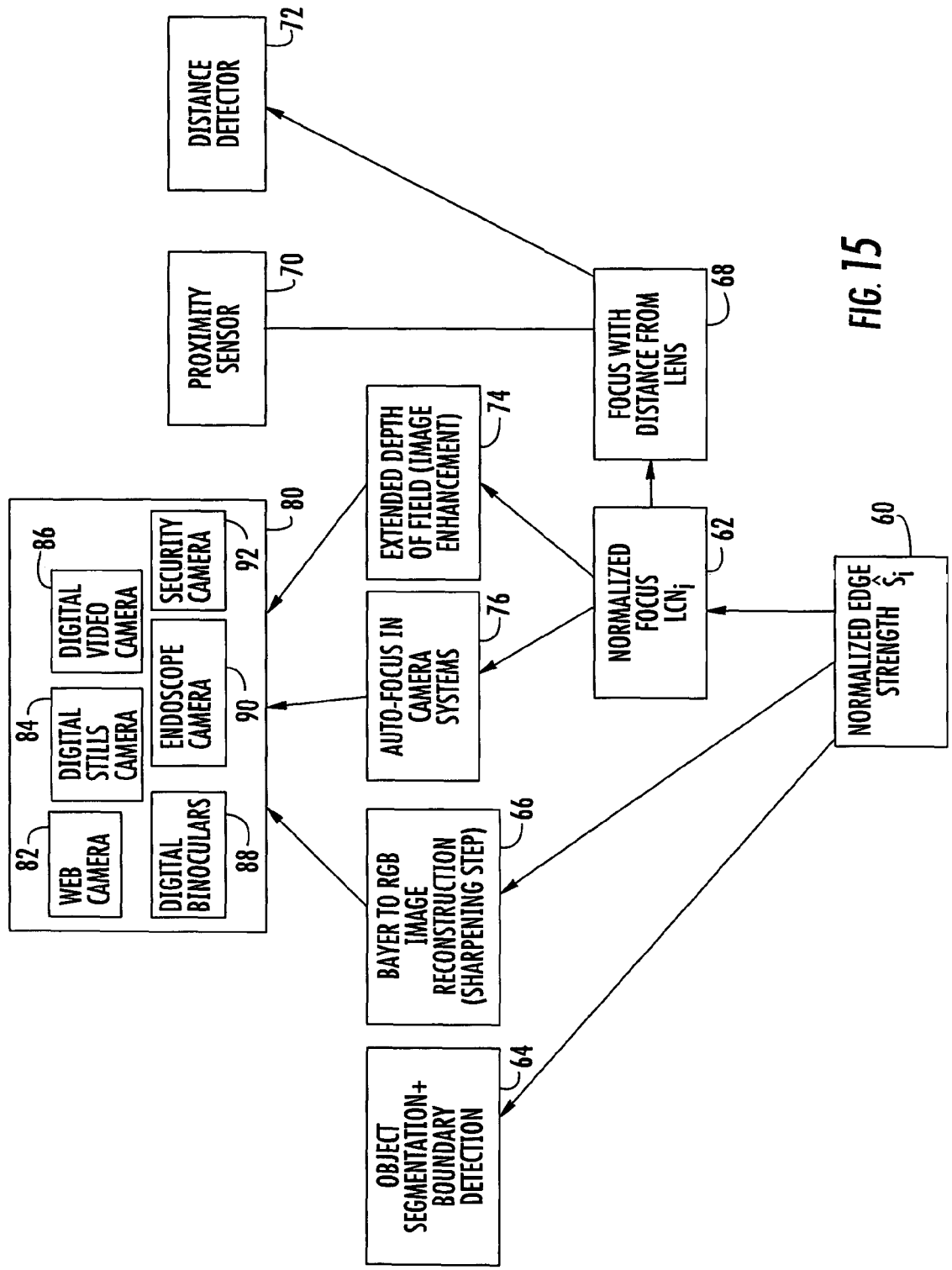
FIG. 15 is a block tree diagram showing the hierarchy of applications of the local contrast normalization process.

FIG. 15 shows a number of applications of the local contrast normalized edge strength $\hat{S}_i$ measurement 60 and the local contrast normalized focus (Foc) measurement 62 obtained from the LCN process. For example, the local contrast normalized edge strength $\hat{S}_i$ measurements 60 can be used in a generalized edge-detector 64 that is immune to the effects of shadows in an imaged scene. Edge strength measurements obtained from conventional edge detectors vary in value according to the illumination of the object from which the edge is detected. However, since the local contrast normalized edge strength $\hat{S}_i$ measurement 60 compensates for the effect of local contrast, edges of similar sharpness are detected with the same or similar local contrast normalized edge strength $\hat{S}_i$ value, irrespective of whether the object to which the edges belong is shadowed in the original scene.

Local contrast normalized edge strength $\hat{S}_i$ measurements 60 can also be used for Bayer to RGB image reconstruction 66. In particular, during the construction of a colorized image from a Bayer pattern array, an edge-sharpening step is typically performed when an edge is detected in the scene by an edge detector. The edge-sharpening step is used to compensate for the effects of low-pass filtering performed earlier in the reconstruction procedure. The extent of the edge sharpening performed during this step is proportional to the magnitude of the response of the edge-detector.

As will be recalled, the response of a traditional edge-detector varies in accordance with the illumination or brightness of an imaged object. However, in the present case, if the response of the edge-detector varies according to the local brightness levels of the scene, the edges will not be equally sharpened across the scene. The local contrast normalized edge strength $\hat{S}_i$ measurements 60 from the LCN process provide a mechanism for overcoming this problem and thereby producing improved, homogeneous edge sharpening throughout an imaged scene.

Since the local contrast normalized focus (Foc) measurement 62 is an absolute focus measurement, it provides a mechanism for isolating the effect of the lens setting of a camera from the distance of the camera to an object, on the eventual focus measurement. Accordingly, a camera system with a fixed lens may employ the LCN process to determine the distance to an imaged object from the local contrast normalized focus (Foc) measurement 68. In particular, objects that are close to the camera will produce a high value of the local contrast normalized focus (Foc) measurement 62 (because they will be in focus) and similarly objects that are far away from the camera will produce low values of the local contrast normalized focus (Foc) measurement 62 (because they will be out of focus). Using this principle a calibration model may be built to directly relate the local contrast normalized focus (Foc) measurement 62 obtained from a fixed lens camera to the distance of the camera to an imaged object. This method of distance measurement could be employed in proximity sensors 70 or other distance detectors 72.

Similarly, since the local contrast normalized focus (Foc) measurement 62 does not vary with the content of a scene, it is possible to obtain images from a scene with different lens settings, select the in-focus elements from each image and merge these elements together to create a composite image 74. The resulting composite image has a greater effective depth of field than any of the original images. In other words, a larger proportion of the elements in the composite image are properly focused than in any of the original images.

As mentioned earlier, the local contrast normalized focus (Foc) measurements can be used in an autofocusing control optimization process 76. The autofocusing process 76, Bayer to RGB image reconstruction process 66 and the method for extending the depth of field of an imaged scene 74 could be used in a wide variety of devices 80 including web-cameras 82, digital stills cameras 84, digital video cameras 86, digital binoculars 88, endoscope cameras 90 and security cameras.

It will be appreciated that the applications of the LCN process are not limited to the examples mentioned above and that the person skilled in the art may employ standard techniques in order to implement the invention in these and other ways. Modifications and alterations may be made to the above without departing from the scope of the invention.

That which is claimed is:

1. A method of image processing within a circuit including a data input, a data output and a data processor, the method comprising:
   determining, with the data processor, a first measure of a strength of at least one edge, each edge having an orientation, in an image received from the data input by processing the image with at least one first order edge detection kernel adapted to reject edge phasing effects;
   determining a second measure of the strength of each edge in the image by determining a contrast of each edge, and normalizing the first measure of the strength of each edge based upon the contrast;
   rescaling the second measure of the strength of each of the edges;
   selecting at least one edge from the image based upon the rescaled second measure of their strengths; and
   calculating a focus measurement from the second measure of the strengths of the selected edges; and providing an estimate of the orientation of each edge on the data output.

2. The method as claimed in claim 1 wherein the at least one first order edge detection kernel includes a central element substantially equal to zero.

3. The method as claimed in claim 1 wherein the at least one first order edge detection kernel is adapted to respond to substantially horizontally, vertically or diagonally oriented edges.

4. The method as claimed in claim 1 wherein each edge has an orientation and the contrast of each edge is determined in the direction perpendicular to the orientation of each edge.

5. The method as claimed in claim 1 wherein normalizing comprises dividing the first measure of the strength of each edge by its contrast.

6. The method as claimed in claim 1 wherein normalizing comprises dividing the first measure of the strength of each edge by its contrast.

7. The method as claimed in claim 1 wherein selecting is based upon the rescaled second measure of edge strength exceeding a percentage of a maximum rescaled second measure of edge strength of the entire image.

8. The method as claimed in claim 1 wherein selecting comprises selecting edges based upon their contrast exceeding a minimum contrast of the entire image.

9. The method as claimed in claim 1 wherein selecting comprises selecting edges using a histogram of the rescaled second measures of the edge strengths.

10. The method as claimed in claim 9 wherein edges are selected based upon the rescaled second measure of their edge strength occurring with a frequency that exceeds a percentage of a most frequently occurring second measure of edge strength in the image.

11. The method as claimed in claim 9 wherein the focus measurement is calculated as the center of mass of the rescaled second measures of the strengths of the selected edges.

12. The method as claimed in claim 1, wherein the at least one edge comprises at least one edge in each of a plurality of regions of the image; wherein selecting comprises selecting at least one edge from each region in accordance with the second measure of their strength; and further comprising:
   calculating the focus measure for each region from the second measure of the strengths of the selected edges; and
   averaging the focus measures from each region.

13. The method as claimed in claim 12 wherein normalizing comprises dividing the first measure of the strength of each edge by its contrast.

14. The method as claimed in claim 1, further comprising auto-focusing a lens of a camera based upon the focus measurement.

15. The method as claimed in claim 1, wherein the focus measurement is calculated for a plurality of images of a first object positioned at a plurality of different distances from a camera with a fixed lens setting; further comprising:
   developing a calibration model based on the focus measurements of the first object;
   determining the distance between a second object and the camera by
      determining the focus measurement from an image of the second object, and
      calculating the distance between the camera and the second object from using the calibration model and the focus measurement of the second object.

16. A circuit comprising:
   a data input;
   a data output; and
   a data processor to determine a first measure of a strength of at least one edge, each edge having an orientation, from image data received from the data input by processing the image data with at least one first order edge detection kernel adapted to reject edge phasing effects, and providing an estimate of the orientation of each edge on the data output;
   said data processor also to determine a second measure of a strength of each edge from the image data by determining the contrast of each edge, and normalizing the first measure of the strength of each edge by its contrast;
   said data processor also to determine a focus measurement from the image data by
      rescaling the second measure of the strength of each of the edges,
      selecting at least one edge from the image in accordance with the rescaled second measure of their strengths, and
      calculating the focus measurement from the second measure of the strengths of each selected edge.

17. The circuit as claimed in claim 16, wherein the data processor transmits the first measure of edge strength to the data output.

18. The circuit as claimed in claim 16, wherein the at least one edge comprises at least one edge in each of a plurality of regions of the image; wherein selecting comprises selecting at least one edge from each region in accordance with the second measure of their strength; wherein the data processor determines the focus measurement from the single frame of image data by averaging the focus measurements from each region.

19. The circuit as claimed in claim 16, wherein the focus measurements from the data processor are used to auto-focus a lens of a camera.

20. The circuit as claimed in claim 16, wherein the focus measurement is calculated for a plurality of images of a first object positioned at a plurality of different distances from a camera with a fixed lens setting; and wherein the data processor:
   develops a calibration model based on the focus measurements of the first object;
   determines the distance between a second object and the camera by
      determining the focus measurement from an image of the second object, and
      calculating the distance between the camera and the second object from using the calibration model and the focus measurement of the second object.

21. The circuit as claimed in claim 16 wherein the circuit is an integrated circuit.

22. An electronic device comprising:
   a camera having at least one lens; and
   a circuit including
      a data input receiving image data via the at least one lens,
      a data output, and
      a data processor to determine a first measure of a strength of at least one edge, each edge having an orientation, from the image data received by processing the image data with at least one first order edge detection kernel adapted to reject edge phasing effects, and providing an estimate of the orientation of each edge on the data output;
      said data processor also to determine a second measure of a strength of each edge from the image data by determining the contrast of each edge, and normalizing the first measure of the strength of each edge by its contrast;
      said data processor also to determine a focus measurement from the image data by
         rescaling the second measure of the strength of each of the edges,
         selecting at least one edge from the image in accordance with the rescaled second measure of their strengths, and
         calculating the focus measurement from the second measure of the strengths of each selected edge.

23. The electronic device as claimed in claim 22, wherein the electronic device is a distance detector and the at least one lens includes a fixed lens setting.

24. The electronic device as claimed in claim 22, wherein the camera is a digital video camera and the at least one lens includes an adjustable lens.

25. The electronic device as claimed in claim 22, wherein the camera is a digital still camera and the at least one lens includes an adjustable lens.

26. The electronic device as claimed in claim 22, wherein the electronic device is a mobile telephone, and the camera comprises at least one of a digital still camera and a digital video camera.

27. The electronic device as claimed in claim 22, wherein the camera is a web camera comprising a digital video camera.

28. The electronic device as claimed in claim 22, wherein the camera is a security camera comprising a digital video camera.

29. The electronic device as claimed in claim 22, wherein the electronic device is a digital ocular device and the at least one lens comprises an adjustable lens.

30. The electronic device as claimed in claim 22, wherein the camera comprises an endoscope camera and the at least one lens comprises an adjustable lens.

* * * * *